(12) United States Patent
Nakaniwa

(10) Patent No.: US 8,567,731 B2
(45) Date of Patent: Oct. 29, 2013

(54) TRIPOD-SUPPORTING DEVICE AND SUPPORTING MEMBER FOR SUPPORTING A TRIPOD

(75) Inventor: Kazuhide Nakaniwa, Minoo (JP)

(73) Assignees: Kansai Kouji Sokuryou Co., Ltd., Osaka (JP); Nishio Rent All Co., Ltd., Osaka (JP)

(*) Notice: Subject to any disclaimer, the term of this patent is extended or adjusted under 35 U.S.C. 154(b) by 241 days.

(21) Appl. No.: 12/996,425

(22) PCT Filed: Jun. 2, 2009

(86) PCT No.: PCT/JP2009/060064
§ 371 (c)(1),
(2), (4) Date: Dec. 27, 2010

(87) PCT Pub. No.: WO2009/148053
PCT Pub. Date: Dec. 10, 2009

(65) Prior Publication Data
US 2011/0155886 A1     Jun. 30, 2011

(30) Foreign Application Priority Data

Jun. 5, 2008  (JP) .................................. 2008-148143
Dec. 1, 2008  (JP) .................................. 2008-306255
Mar. 10, 2009 (JP) .................................. 2009-056560

(51) Int. Cl.
*F16M 11/00* (2006.01)

(52) U.S. Cl.
USPC .......................... 248/163.1; 248/169; 248/530

(58) Field of Classification Search
USPC ........ 248/163.1, 530, 156, 545, 188.8, 188.9, 248/188.91, 223.41, 291.1, 294.1, 351, 357, 248/166, 168, 169
See application file for complete search history.

(56) References Cited

U.S. PATENT DOCUMENTS

| 1,650,747 | A | * | 11/1927 | Thalhammer | 248/168 |
| 2,668,682 | A | * | 2/1954 | Dalton | 248/169 |
| 3,121,556 | A | * | 2/1964 | Faulkner | 254/2 R |
| 4,640,482 | A | * | 2/1987 | Rogers | 248/168 |
| 2006/0236842 | A1 | * | 10/2006 | Yu | 84/327 |

FOREIGN PATENT DOCUMENTS

| JP | 64-055981 U | 4/1989 |
| JP | 2008-185174 A | 8/2008 |

OTHER PUBLICATIONS

International Search Report (PCT/ISA/210) issued on Jun. 30, 2009, by Japanese Patent Office as the International Searching Authority for International Application No. PCT/JP2009/060064.
Written Opinion (PCT/ISA/237) issued on Jun. 30, 2009, by Japanese Patent Office as the International Searching Authority for International Application No. PCT/JP2009/060064.

(Continued)

*Primary Examiner* — Anita M King
(74) *Attorney, Agent, or Firm* — Buchanan Ingersoll & Rooney PC

(57) ABSTRACT

An attaching means composed of a hole or a groove is formed in the leg of a tripod or another member attached to the legs. A support member inserted in the attaching means is so disposed as to extend in a direction from the attaching means to the ground, toward which direction the tripod is liable to overturn. Therefore, overturning of the tripod can be reliably prevented by a simple operation.

6 Claims, 23 Drawing Sheets

(56) References Cited

OTHER PUBLICATIONS

Notification Concerning Transmittal of copy of International Preliminary Report on Patentability (Forms PCT/IB/326 and PCT/IB/373) and the Written Opinion of the International Searching Authority (in Japanese Form PCT/ISA/237) dated Dec. 16, 2010, issued in the corresponding International Application No. PCT/JP2009/060064.

Notification of Transmittal of Copies of Translation of the International Preliminary Report on Patentability (IPRP) (Forms PCT/IB/338 and PCT/IB/373) dated Jan. 20, 2011 and Written Opinion of the International Searching Authority (Form PCT/ISA/237) dated Jun. 30, 2009, issued in corresponding Japanese PCT Application No. PCT/JP2009/060064.

* cited by examiner

TRIPOD-SUPPORTING DEVICE AND SUPPORTING MEMBER FOR SUPPORTING A TRIPOD

TECHNICAL FIELD

The present invention relates to a tripod-supporting device, a tripod, a support member for a tripod, and a method for supporting a tripod.

BACKGROUND ART

A typical tripod comprises a table for supporting an instrument such as surveying instrument (for example, a level, a target for use in surveying, and a theodolite or total station), a telescope, a camera or an illuminator, and three extendable legs pivotably connected to the table. Each leg has a pointed end at its lowermost portion to facilitate positioning thereof against the ground.

SUMMARY OF THE INVENTION

Problem to be Solved by the Invention

The tripods are often installed on concrete or asphalt paved locations or within the buildings where the pointed ends may not be able to be fixed against the concrete or asphalt ground or floor. This may result in accidental overturning of the tripod due to lateral wind gusts or by the contact with objects being passed by. In fact, a number of tripod overturn accidents have occurred to damage expensive surveying instruments supported on the tripods. The surveying instruments, in particular total stations for example, are precision-made optical devices and, therefore, fixing of the damaged devices may be significantly costly. Although no precise damage cost data of the surveying instruments due to overturn has been reported, it can be empirically considered that each surveying instrument overturns at least once in two or three years to need its fixing. For each year, it can be estimated that approximately 10,000 levels and 20,000 targets are supposed to have been damaged due to the overturn of the tripods.

An object of the present invention is to prevent tripods and various devices such as surveying instruments supported on the tripods from overturning due to wind gust, for example.

SUMMARY OF THE INVENTION

To solve the above-described problem, a tripod-supporting device according to an embodiment of the present invention is to support a tripod (310, 410) which includes a table (12) for supporting an instrument thereon and three legs (40) jointed to the table (12), comprises:

a support member (382, 482) made of a linear rod material, and an attaching means (395, 396, 499) in the form of hole which is formed in one of said three legs (40) or formed in a member attached to one of said three legs;

wherein said attaching means (395, 396, 499) is so designed that, when said support member (382, 482) is inserted in said attaching means, a radial movement of said support member (381, 482) is prohibited by a peripheral wall of said attaching means (395, 396, 499), said support member (382, 482) is slidable in a lengthwise direction of said support member, and said support member (382, 482) extends in a direction that said tripod is liable to overturn, from said attaching means (395, 396, 499) to said ground.

A tripod device according to an embodiment of the present invention comprises a table (12) for setting instruments thereon, three legs (40) jointed to the table (12), and a support member (382, 482) composed of a linear rod material;

and this tripod device is characterized in that a attaching means (395, 396, 499) composed of a hole is formed in the leg (40) or another member (492) attached to the leg;

the attaching means (395, 396, 499) is so formed as to function as follows, when the support member (382, 482) has been inserted into the attaching means: that is, to inhibit the support member (382, 482) from moving in a radius direction because of the peripheral wall portion of the attaching means (395, 396, 499); to allow the support member (382, 482) to be slidable in the lengthwise direction of the support member; and to allow the support member (382, 482) to extend in a direction from the attaching means (395, 396, 499) to the ground, toward which direction the tripod is liable to overturn.

A tripod-supporting device according to other embodiment of the present invention is a tripod-supporting device for supporting a tripod (10, 210) which includes a table (12) for supporting an instrument thereon;

three legs (40) jointed to said table (12);

a support member (382, 482) made of a linear rod material; and an attaching means (395, 396, 499) in the form of hole which is formed in one of said three legs (40) or formed in a member attached to one of said three legs;

wherein said attaching means (395, 396, 499) is so designed that, when said support member (382, 482) is inserted in said attaching means, a radial movement of said support member (381, 482) is prohibited by a peripheral wall of said attaching means (395, 396, 499), said support member (382, 482) is slidable in a lengthwise direction of said support member, and said support member (382, 482) extends in a direction that said tripod is liable to overturn, from said attaching means (395, 396, 499) to said ground.

A tripod device according to other embodiment of the present invention comprises a table (12) for supporting an instrument thereon, three legs (40) jointed to said table (12), and a support member (82, 182, 282, 582, 682) attachable to the lower end of said leg (40), wherein an attaching means (95, 595, 695) composed of a hole or a groove is formed in either said leg (40) or another member (92, 192, 292) attached to said leg;

said support member (82, 182, 282, 582, 682) includes a fit-in portion (85, 185, 585, 685) which is so fitted in said attaching means (95, 595, 695) as to allow said support member to penetrate said member (40, 92, 192, 292) in a predetermined direction, and an elongate portion (83, 84, 183, 184, 284, 583, 584, 683, 684) which extends from said fit-in portion in a predetermined direction;

the distal end of said elongate portion (83, 84, 183, 184, 284, 583, 584, 683, 684) is placed on the ground by rotating said support member (82, 182, 282, 582, 682) around the axis of said penetrating direction, with said fit-in portion (85, 185, 585, 685) fitted in said attaching means (95, 595, 695); and said elongate portion (83, 84, 183, 184, 284, 583, 584, 683, 684) is so disposed as to extend in a direction from said fit-in portion (85, 185, 585, 685) to the ground, toward which direction the tripod is liable to overturn, when the distal end of said elongate portion is placed on the ground.

A support member for a tripod, according to a further embodiment of the present invention, is a support member (82, 182, 282, 582, 682) for supporting a tripod (10, 210) which includes a table (12) for supporting an instrument thereon, and three legs (40) jointed to said table (12), said support member comprising a fit-in portion (85, 185, 585, 685) to be fitted in a attaching means (95, 595, 695) composed of a hole or a groove formed in a leg (40) or another member (92, 192, 292) attached to said leg, so that said support member can penetrate said leg (40) or said another member (92, 192, 292) in a predetermined direction; and an elongate portion (83, 84, 183, 184, 284, 583, 584, 683, 684) which has a distal end to be placed on the ground by rotating said support member (82, 182, 282, 582, 682) around an axis of said penetrating direction, with said fit-in portion (85, 185, 585, 685) fitted in said attaching means (95, 595, 695), and which is so disposed as to extend in a direction from said fit-in portion (85, 185, 585, 685) to the ground, toward which direction the tripod is liable to overturn, when said distal end of said elongate portion has been placed on the ground.

A tripod-supporting method according to a further embodiment of the present invention is a method for supporting a tripod (10, 210) which includes a table (12) for supporting an instrument thereon, and three legs (40) jointed to said table (12), by using a attaching means (95, 595, 695) composed of a hole or a groove formed in said leg (40) or another member (92, 192, 292) attached to said leg; and a support member (82, 182, 282, 582, 682) which includes a fit-in portion (85, 185, 585, 685) to be fitted in said attaching means (95, 595, 695) so that said support member can penetrate said leg (40) or said another member (92, 192, 292) along a predetermined direction; and an elongate portion (83, 84, 183, 184, 284, 583, 584, 683, 684) which is so disposed as to extend in a direction from said fit-in portion to the ground, toward which direction the tripod is liable to overturn, said method being characterized in that the distal end of said elongate portion (83, 84, 183, 184, 284, 583, 584, 683, 684) is placed on the ground by rotating said support member (82, 182, 282, 582, 682) around the axis of said penetrating direction, with said fit-in portion (85, 185, 585, 685) fitted in said attaching means (95, 595, 695).

Effect of the Invention

According to the present invention, it is possible to attach a support member to at least one of the three legs or another member attached to the leg so that the support member can extend from a predetermined position of the leg or another member to the ground, toward which direction the tripod is liable to overturn. Accordingly, it is possible to support the tripod so as to inhibit inclining of the tripod because of the support member, even when the tripod is apt to be inclined due to a gust of wind or an impact. Therefore, overturning of the tripod can be surely prevented, and consequently, damage of various instruments such as surveying instrument set on the table of the tripod can be reliably prevented.

According to one embodiment of the present invention, the support member composed of the linear rod material can be very readily attached to the tripod, simply by inserting the support member into the attaching means of the leg or another member of the tripod.

Further, according to other embodiment of the present invention, the distal end of the support member can be placed on the ground, simply by inserting the support member into the attaching means of the leg or another member of the tripod, and rotating the inserted support member in the predetermined direction. Therefore, the operation for attaching the support member is very easy.

EMBODIMENTS FOR CARRYING OUT THE INVENTION

Figure 1:
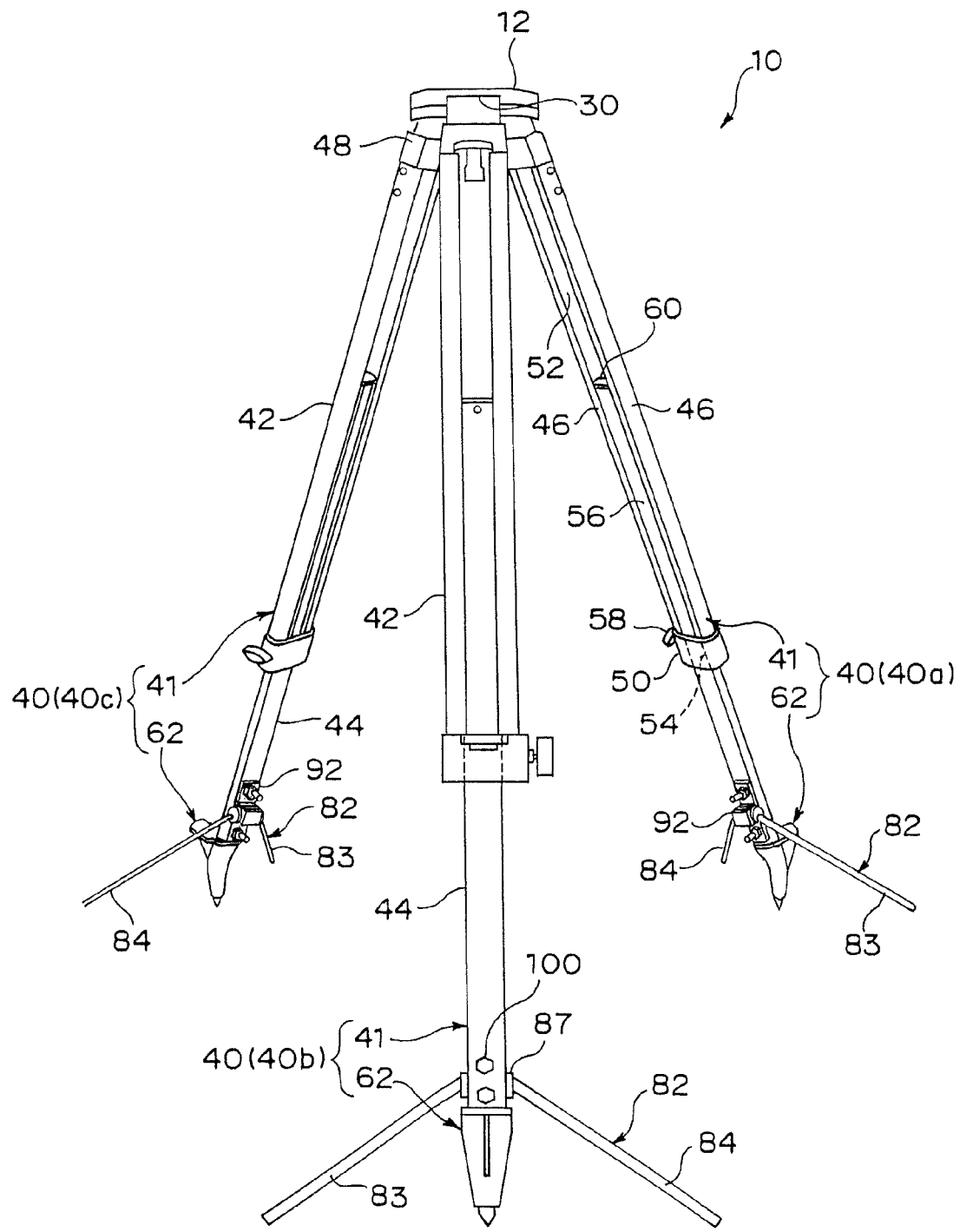
FIG. 1 is a perspective view of a tripod according to the first embodiment of the present invention.

Several embodiments of the present invention will be described with reference to the accompanying drawings. In the embodiments described below, the like members or like portions are denoted by like reference numerals. It should be noted that directional terminologies indicating specific directions such as "upper", "lower" and combinations thereof are used to indicate respective directions relating to the tripod in use. Also, although the embodiments which will be described below are directed to tripods for use in surveying, the present invention may be likewise applied to tripods for supporting another device such as telescope, camera or illuminator.

First Embodiment

Figure 2:
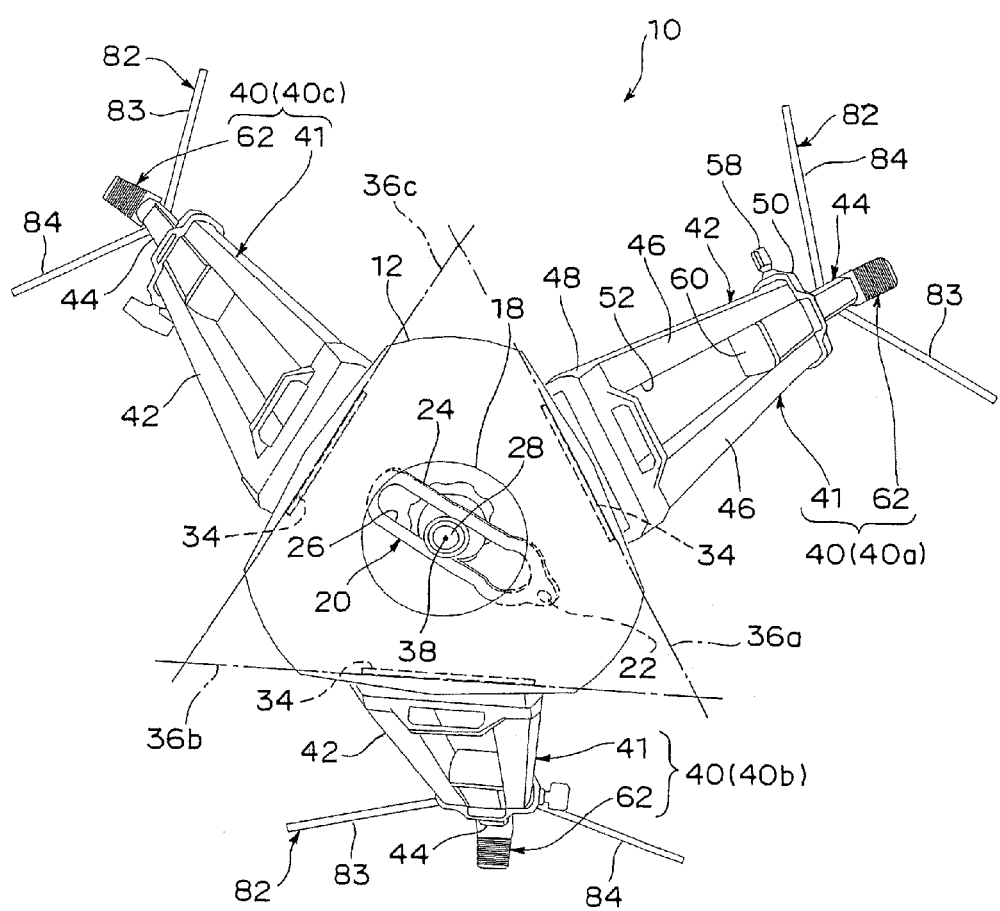
FIG. 2 is a plan view of the tripod shown in FIG. 1.

FIGS. 1 and 2 show a tripod 10 according to the first embodiment of the present invention. This tripod 10 is suitably used to install a surveying instrument on a relatively flat asphalt pavement or concrete floor. The tripod 10 has a top plate or table 12 for supporting thereon a surveying instrument such as a level, a target, theodolite, or a total station. The table 12 has a substantially equilateral triangle in shape when viewed from above.

As shown in FIG. 2, the table 12 has a central circular opening (or a hole) 18 defined therein. A locking mechanism 20 is provided below the opening 18 for locking the surveying instrument to be mounted on the table 12. For example, the locking mechanism 20 comprises a vertical shaft 22 mounted on the bottom surface of the table 12, a guide 24 supported by the shaft 22 for horizontal rotation about the shaft, and a screw 28 movable in a horizontal direction within a slot 26 formed in the guide 24. Provided at respective peripheral edges of the triangle plate 12 are three support shafts 34 extending in parallel to respective edges. Longitudinal axes 36a-36c of the support shafts 34, indicated by long and short dotted lines, define an equilateral triangle surrounded thereby. The center of the triangular region coincides with the center 38 of the plate 12.

Legs 40 (40a to 40c) are connected to the support rods 34 of the table 12. Each leg 40 has upper and lower leg portions 42 and 44 which constitute a major part 41 of the leg. The upper leg portion 42 includes two columns 46 disposed in parallel to each other. The two columns 46 are jointed to each other by an upper joint 48 and a lower joint 50, defining a guide slot 52 having a certain cross section therebetween.

The upper joint 48 is connected to the support rod 34. This allows the leg 40 to pivot along a vertical plane including the center 38 of the table 12 between a closed position extending substantially vertically and downwardly from the plate 12 and an opened position opened and pivoted outwardly from the closed position.

The lower joint 50 defines a through hole 54 extending from the guide slot 52 so that the lower leg portion 44 is accommodated into the guide slot 52 through the hole 54.

The lower leg portion 44 has a column 56. In this embodiment, the column 56 has substantially the same cross-section as the that of guide slot 52 and the through hole 54, so that the column 56 is positioned within the guide slot 52 via the through hole 54. An extension of the lower leg portion 44, in particular, column 56, relative to the upper leg portion 42 can be adjusted as needed. A screw 58 is provided on the lower joint 50 of the upper leg portion 42 to secure the lower leg portion 44 against the upper leg portion 42 after the adjustment of the extension of the lower leg portion 44 relative to the upper leg portion 42.

The upper end portion of the column 56 carries a stop 60. The stop 60 is configured to be larger in size than the cross section of the through hole 54 to prevent the lower leg portion 44 from passing therethrough to drop out of the upper leg portion 42.

Figure 4:
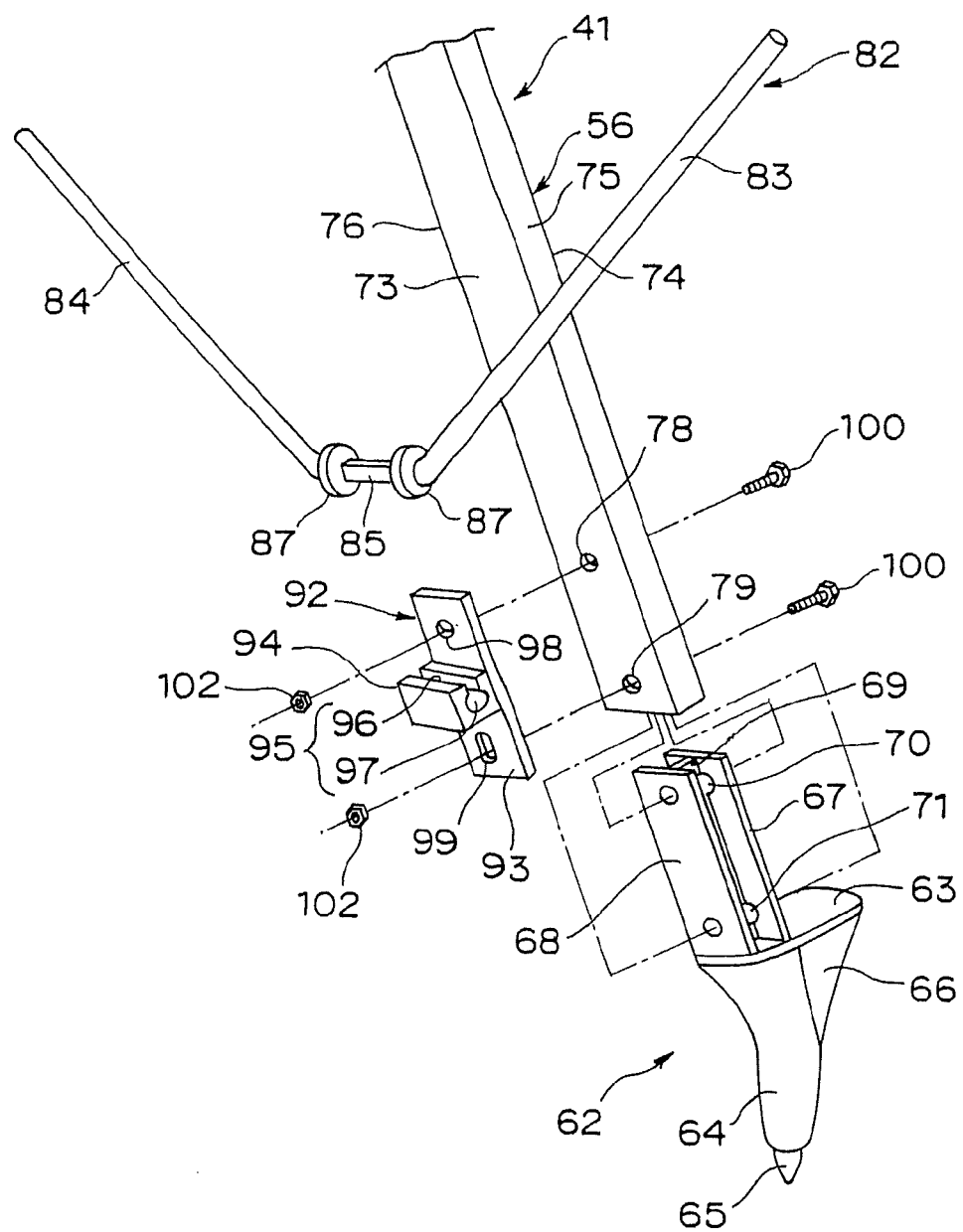
FIG. 4 is an exploded perspective view of the lower end portion of the tripod shown in FIG. 1.

As shown in FIG. 4, the column 56 is made of a square tube having a rear or inner surface 73 adjacent the center of the tripod 10, an opposite front or outer surface 74, and a pair of side surfaces 75 and 76 connecting between the inner and outer surfaces 73 and 74. Upper and lower through holes 78 and 79 are formed in the lower portion of the column 56. For example, the through holes 78 and 79 are formed in the inner and outer surfaces 73 and 74 of the column 56. Bolts 100 are inserted through the through holes 78 and 79 to secure a foot 62 to the column 56.

The foot 62 is secured to the lower end of the major leg part 41, i.e., the lower end of the column 56, with bolts 100.

The foot 62 comprises a horizontal plate 63 extending horizontally or substantially horizontally, a pair of vertical plates 67 and 68 extending upwardly from the horizontal plate 63, a foot body 64 extending downwardly from the horizontal plate 63, a pointed end 65 projected downwardly from the lower end of the foot body 64, and a rib plate 66 extending between the foot body 64 and the horizontal plate 63. The pointed end 65 is formed in the shape of inverted circular cone, truncated cone, pyramid or truncated pyramid of which transverse cross section decreases gradually toward the distal end thereof (lowermost end thereof). The foot 62 includes a joint plate 69 and upper and lower cylindrical tubes 70 and 71 connecting between the vertical plates 67 and 68. Bolts 100 are capable of being inserted through the cylindrical tubes 70 and 71. A distance between the cylindrical tubes 70 and 71 is set to be the same as that between the through holes 78 and 79 of the column 56.

To attach the foot 62 to the column 56, the vertical plates 67 and 68 are inserted into the lower end portion of the column 56. Then, the through holes 78 and 79 of the column 56 are aligned with the cylindrical portions 70 and 71 of the foot 62, and the bolts 100 are inserted through the holes 78 and 79 and the cylindrical portion 70 and 71. The bolts 100 are screwed into nuts 102 to secure the foot 62 to the lower end of the column 56. A locking member 92 may be secured to the column 56, together with the foot 62. Details of the locking member 92 will be described later.

As shown in FIG. 1, support members 82 are removably attached to the lower end portions of the legs 40 for supporting the tripod 10. It should be noted that, although every leg 40 is equipped with the support member 82, only one or two selected legs 40 may be equipped with the support members 82.

As shown in FIG. 4, the support member 82 may be attached to the leg 40 via the locking member 92 removably attached to the column 56 of the leg 40.

The locking member 92 comprises, for example, a rectangular plate 93 and a projection 94 provided on the plate 93. The plate 93 has bolt insertion holes 98 and 99 formed therein corresponding to the through holes 78 and 79 of the column 56, so as to insert the bolts. The holes 98 and 99 are formed on the upper and lower sides with the projection 94 interposed therebetween, respectively. Preferably, at least one of the upper and lower holes 98 and 99 is extended vertically. In this embodiment, the lower hole 99 is extended in the vertical direction. The projection 94, which is in the form of box, for example, has a groove 95 defined in the upper surface, for example, and extending between the opposite side surfaces, in which the support member is mounted. The groove 95 is formed so that, when the locking member 92 is attached to the column 56, it extends substantially horizontally. When the locking member 92 is attached on the column 56, the groove 95 may be oriented in another direction provided that the support member 82 positioned in the groove 95 can rotate about a longitudinal axis thereof within the groove 95 to place its end on the ground. The groove 95 has a bottom portion 97 to receive a part of the support member 82, and an opening 96 which communicates an exterior of the groove 95 with an interior of the bottom portion 97. The bottom portion 97 of the groove has a circular in cross section, for example, having a width larger than that of the opening 96.

The locking member 92 can be secured to the column 56, together with the foot 62 by aligning the through holes 98 and 99 of the plate 93 with the through holes 78 and 79 of the column 56, inserting the bolts 100 into the holes 98 and 99, and then screwing them into the nuts 102. Accordingly, no through hole or fixing member such as bolt is needed in the leg exclusively for attaching the locking member 92 to the column 56. Although the locking member 92 is secured to the outer surface 74 of the column 56, it may be secured to the inner surface of the column 56.

Although a metal is used for the locking member 92, material of the locking member is not limited to and other materials such as resin may be used.

The support member 82 comprises a fit-in portion 85 to be fitted in the groove 95 of the locking member 92, and a pair of elongate portions 83 and 84 extending from the fit-in portion 85 in opposite directions.

The fit-in portion 85 has a length equal to or slightly longer than the groove 95. The fit-in portion 85 is configured to be accommodated in the bottom portion 97 of the groove 95 of the locking member 92 and also passed through the opening 96 of the groove 95 only when it is oriented in a certain direction. Specifically, the fit-in portion 85 has a rectangular cross section defined by a pair of opposed short sides smaller than the width of the opening 96 and a pair of opposed long sides larger than the width of the opening 96 but smaller than the diameter of the bottom portion 97 of the groove. Stops 87 are provided on longitudinal opposite ends of the fit-in portion 85 to prevent the fit-in portion 85 from moving in the longitudinal direction within the groove 95. For example, the stop 87 is in the form of disk having a larger diameter than that of the bottom portion 97 of the groove 95. This allows that, when the fit-in portion 85 fitted in the groove 95 is forced in its longitudinal direction, the stop 87 engages with the side surface of the projection 94 of the locking member 95 to prevent the fit-in portion 85 from moving in the longitudinal direction.

One end of the fit-in portion 85 in the longitudinal direction, adjacent one stop 87, is jointed to one elongate portion 83. The other end of the fit-in portion 85 in the longitudinal direction, adjacent the other stop 87, is jointed to the other elongate portion 84. The elongate portions 83 and 84 extend obliquely to the fit-in portion 85. The two elongate portions 83 and 84 have substantially the same lengths and are positioned on the same plane. This allows that, when the support member 82 is combined with the locking member 92 with the fit-in portion 85 fitted in the groove 95 and then rotated about its longitudinal axis, the distal ends of the elongate portions 83 and 84 hit the ground substantially at the same time. Further, the elongate portions 83 and 84 define substantially a right angle therebetween. In this embodiment, the elongate portions 83 and 84 have circular cross sections. The cross sectional shapes of the elongate portions 83 and 84 are not limited thereto. For example, the elongate portion 83 or 84 may be tapered and have a circular or rectangular cross section. As discussed above, the support member 82 is made of bent-up bar having two elongate portions 83 and 84 and the fit-in portion 85.

The support member 82 is made of, for example, a metal, but the material of the support member 82 is not limited thereto. For example, a resin may be used instead.

Figure 5:
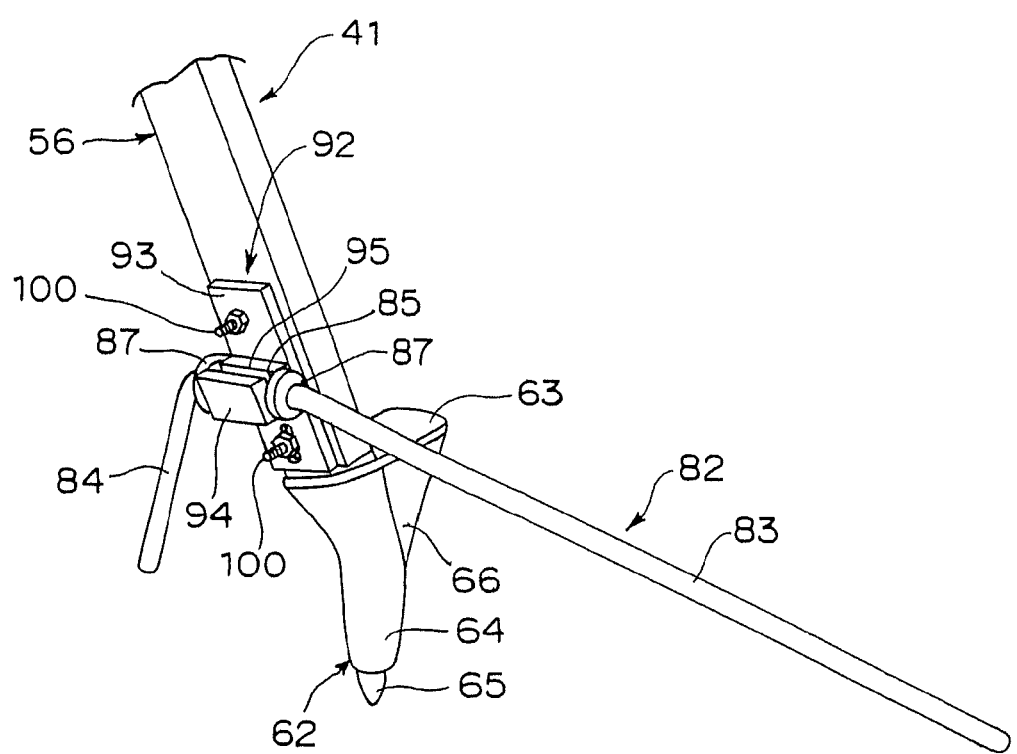
FIG. 5 is a perspective view of the assembling of the members of the tripod shown in FIG. 4.

When assembling the support member 82 to the locking member 92, the fit-in portion 85 is inserted from above into the groove 95 of the locking member 92, with the short side thereof faced downward, into the bottom portion 97 of the groove 95. In this condition, the fit-in portion 85 of the support member 82 penetrates the locking member 92 in the horizontal direction. Subsequently, the fit-in portion 85 is rotated within the groove 95 about the longitudinal axis until the distal ends of the two elongate portions 83 and 84 hit the ground (see FIG. 5). Although depending upon the rotational directions the distal ends of the elongate portions 83 and 84 may hit different positions of the ground; one positions close to the center of the table and the other positions away from the center, it is preferable to rotate the support member 82 so that the distal ends thereof hit the latter portions as shown in FIG. 2.

As above, the support member 82 combined with the leg via the locking member 92 is oriented toward which direction the tripod 10 is liable to overturn.

Figure 6:
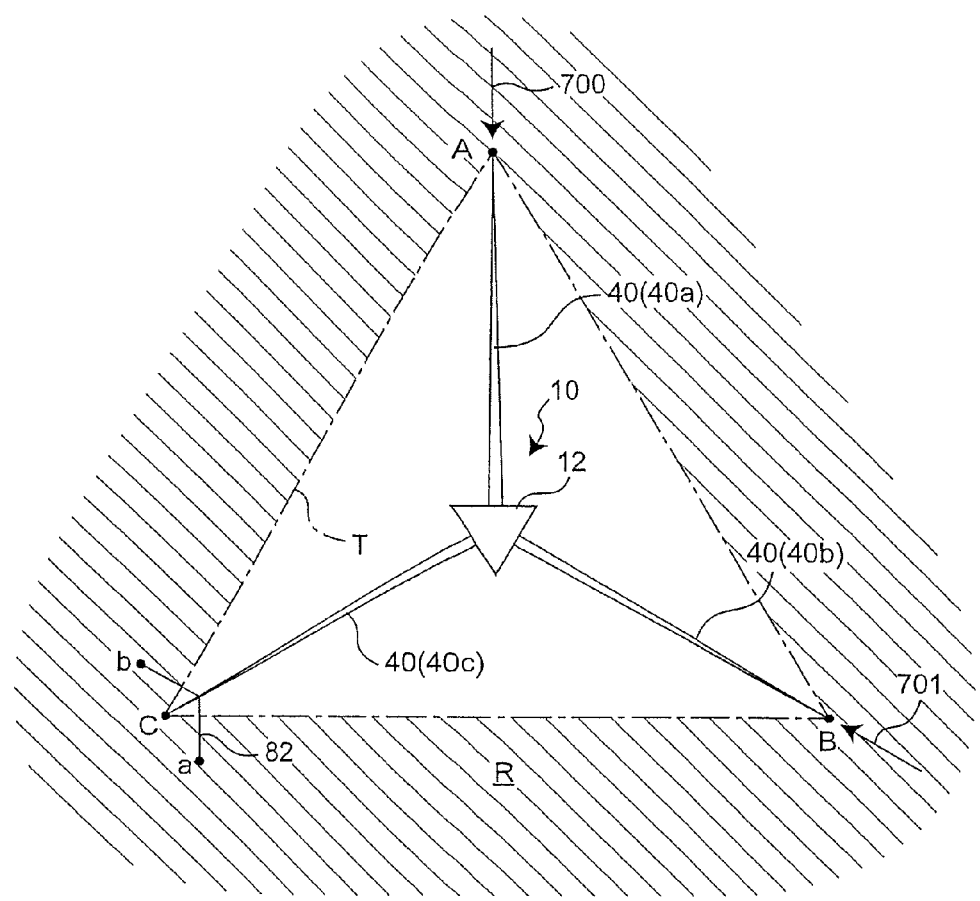
FIG. 6 is a diagram for illustrating "a direction toward which the tripod is liable to overturn.

With reference to FIG. 6, "the direction toward which the tripod 10 is liable to overturn" is described. FIG. 6 is a plan view of the tripod 10, schematically illustrating the tripod 10 installed on the ground. In FIG. 6, the grounded positions of the lower ends of the legs 40a, 40b, and 40c are indicated by "A", "B", and "C", respectively. Following discussions will be made to the support member 82, among others, attached to the leg 40c. When the tripod 10 is forced in a direction indicated at 700, this direction is "the direction toward which the tripod 10 is liable to overturn". Accordingly, the distal end of the support member 82 is preferably placed at point "a" indicated in the drawing, in which the support member 82 can resist the force acting in the direction 700 and reliably support the tripod 82. Even when the distal end of the support member is grounded at a position somewhat away from the position "a", the tripod 10 can be stably supported by the support member 82. When the tripod 10 is forced in a direction indicated at 701, this direction is "the direction toward which the tripod 10 is liable to overturn". In this instance, the support member 82 of which distal end is grounded at "b" reliably resists the force in the direction 701 to support the tripod 10. A small displacement of the grounded position "b" of the support member does not affect its overturn resistance. As discussed above, a region where the distal ends of the support members 82 may hit the ground is so wide, however, the support members 82 can resist the force in any direction as long as the distal ends reside within a zone R outside the triangle T defined by short and dotted lines connecting points "A", "B", and "C". Then, in this application "the direction toward which the tripod 10 is liable to overturn" is a direction from the position where the support member is attached to the leg toward any position in the zone R.

Figure 3:
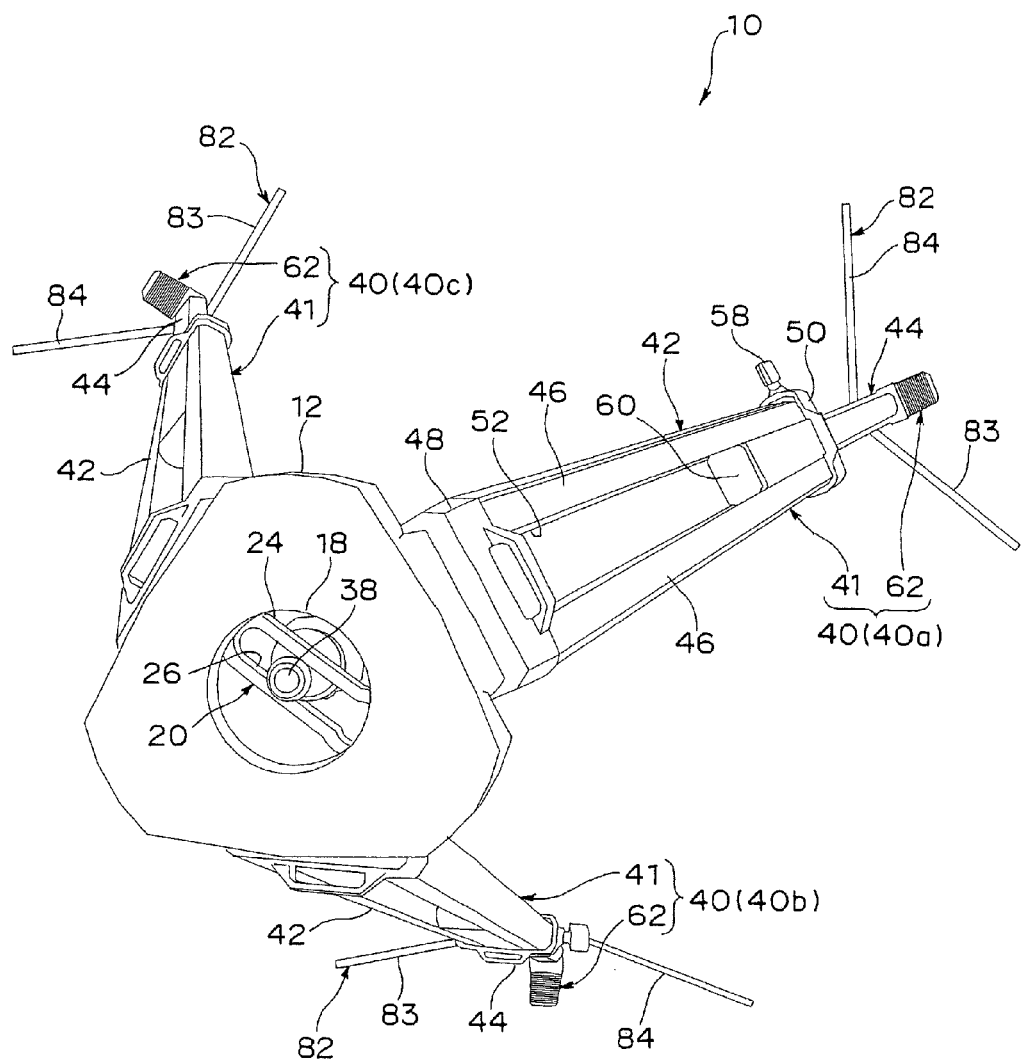
FIG. 3 is a plan view of the tripod shown in FIG. 1, which is inclined.

With the arrangement, as shown in FIG. 3, even when the tripod 10 tilts due to a wind gust, for example, the support member 82 resists the force from the wind gust to reliably prevent tripod 10 together with the surveying instrument mounted on the table 12 from overturning. In the embodiment, the elongate portions 83 and 84 extend in opposite directions from the leg 40, allowing the support member to resist forces in every direction.

Figure 7:
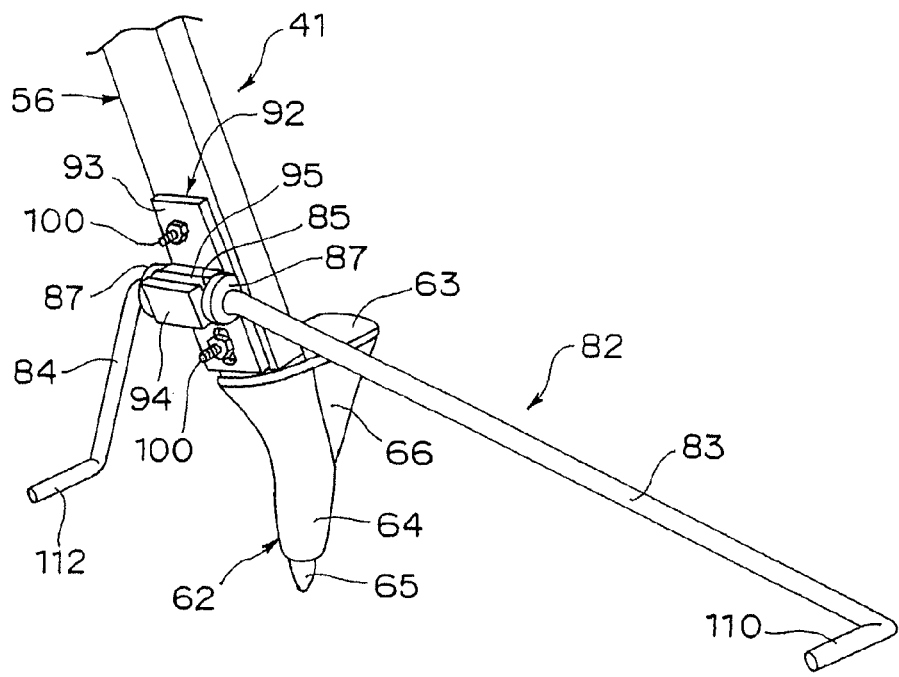
FIG. 7 is a perspective view of a modified example of the support member shown in FIG. 4.

The support member 82 may be modified in various ways. For example, as shown in FIG. 7, distal ends of the elongate portions 83 and 84 may be angled to form bent portions 110 and 112, respectively, which increases frictional forces between the elongate portions 83 and 84 and the ground to prevent overturning of the tripod more reliably.

Figure 8:
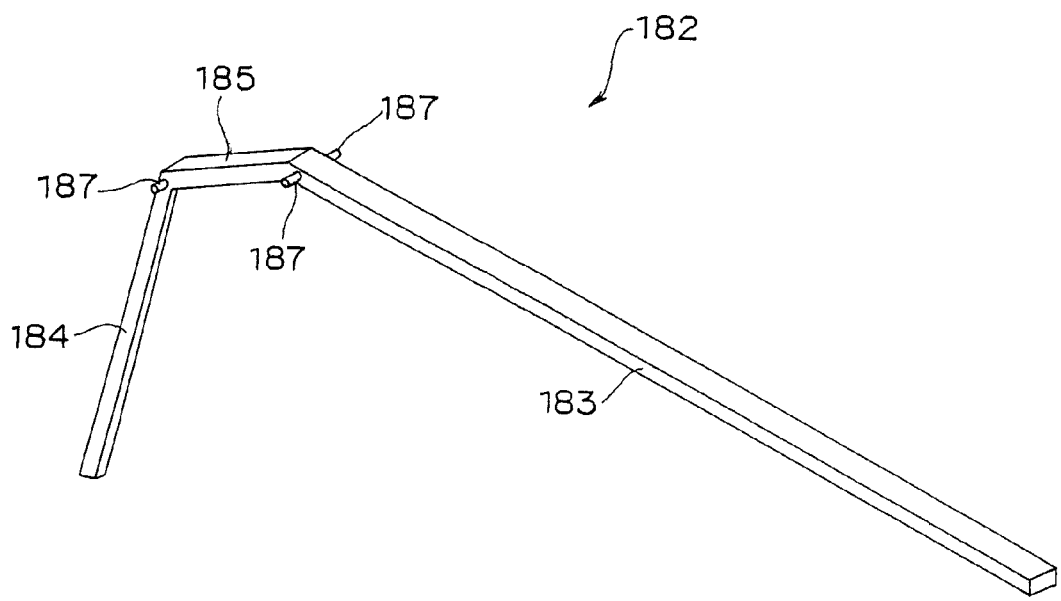
FIG. 8 is a perspective view of another modified example of the support member shown in FIG. 4.

Also, the support member 82 in the first embodiment may be replaced by another support member 182 indicated in FIG. 8. Similar to the support member 82, the support member 182 comprises a fit-in portion 185 to be fitted in the groove 95 of the locking member 92, a pair of elongate portions 183 and 184 extending in predetermined directions from the fit-in portion 185, and stops 187 for preventing the fitted fit-in portion 85 in the groove 95 in the longitudinal direction. The support member 182 differs from the support member 82 in that, similar to the fit-in portion 185, the elongate portions 183 and 184 have rectangular cross sections, which facilitates the manufacturing of the support member. This modification also prevents the tripod from overturning. Stops 187 of the support member 182 are made of rods projected horizontally from the side surface portions adjacent the opposite ends of the fit-in portion 185. The stops function to prevent the fit-in portion 185 from moving in the longitudinal direction, within the groove 95 of the locking member 92, similar to the above-mentioned disk-like stops 87.

Figure 9:
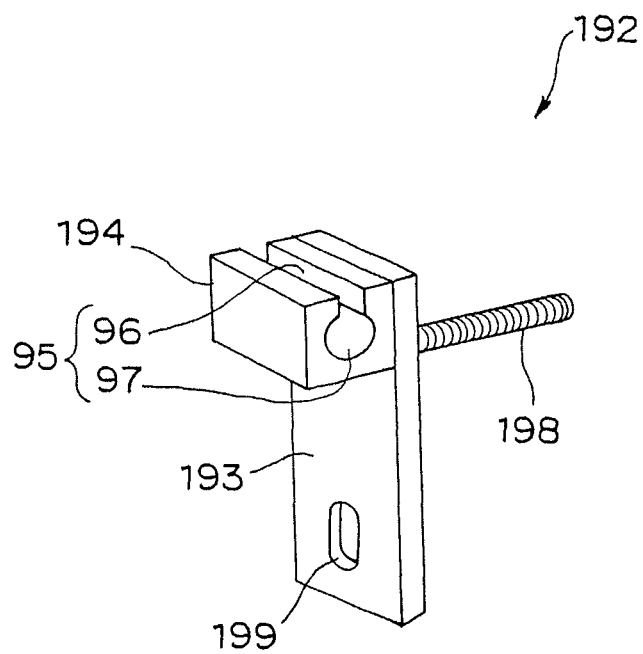
FIG. 9 is a perspective view of a modified example of the locking member shown in FIG. 4.

The locking member 92 in the first embodiment may be replaced with another modified locking member. FIG. 9 shows another locking member 192. Similar to the above-described locking member 92, the locking member 192 comprises a plate 193 and a projection 194 formed on the surface of the plate 193. An upper surface of the projection 194 has a groove formed therein, similar to the groove 95 in the previous embodiment. The locking member 192 differs from the locking member 92 in that the projection 194 is positioned at the upper end portion of the plate 193. This results in that only the lower through hole 199 is provided in the plate 193, i.e., the upper through hole is eliminated from the plate. A bolt 198 is projected from the opposite surface of the plate. The locking member 192 is secured to the column 56 by inserting the bolt 198 of the locking member 192 into the through hole 78 on the upper side of the column 56, aligning the through hole 199 of the locking member 192 with the through hole 79 on the lower side of the column 56, and fastening a nut 102 around the bolt 198 of the locking member 192. Also, another bolt 100 is inserted into the through hole 199 and is fastened with the nut 102. Thus, the locking member 192 is secured to the column 56, together with the foot 62, similar to the locking member 92.

Figure 10:
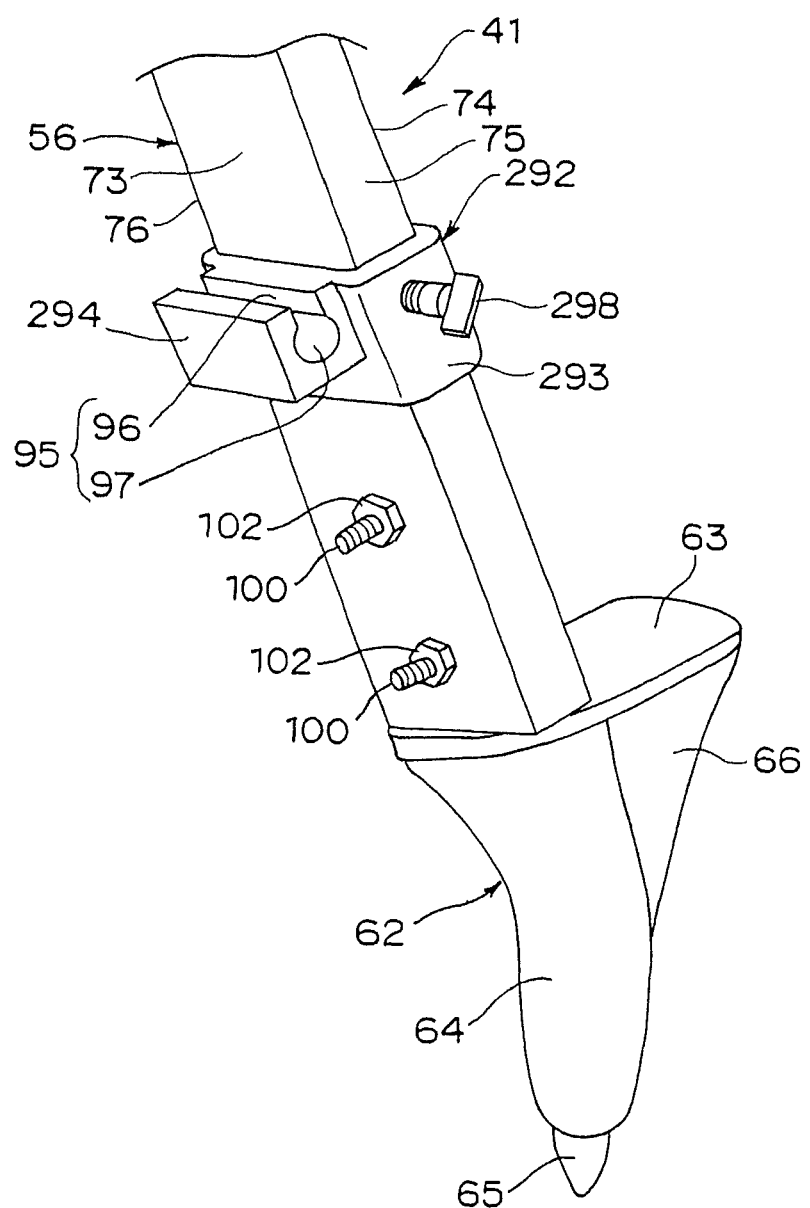
FIG. 10 is a perspective view of another modified example of the locking member shown in FIG. 4.

A locking member 292 shown in FIG. 10 may be used in place of the locking member 92. The locking member 292 comprises a cylindrical member 293 slidably fitted around the column 56 along the longitudinal direction of the column 56, and a projection 294 formed on the surface of the cylindrical portion 293. The groove 95 is formed in the upper surface of the projection 294. A screw 298 is provided at the side wall of the cylindrical portion 293 to secure the cylindrical portion 293 to the column 56. This allows that, by loosing the screw 298, the cylindrical portion 293 can be moved to adjust the height of the locking member 292.

Second Embodiment

Figure 11:
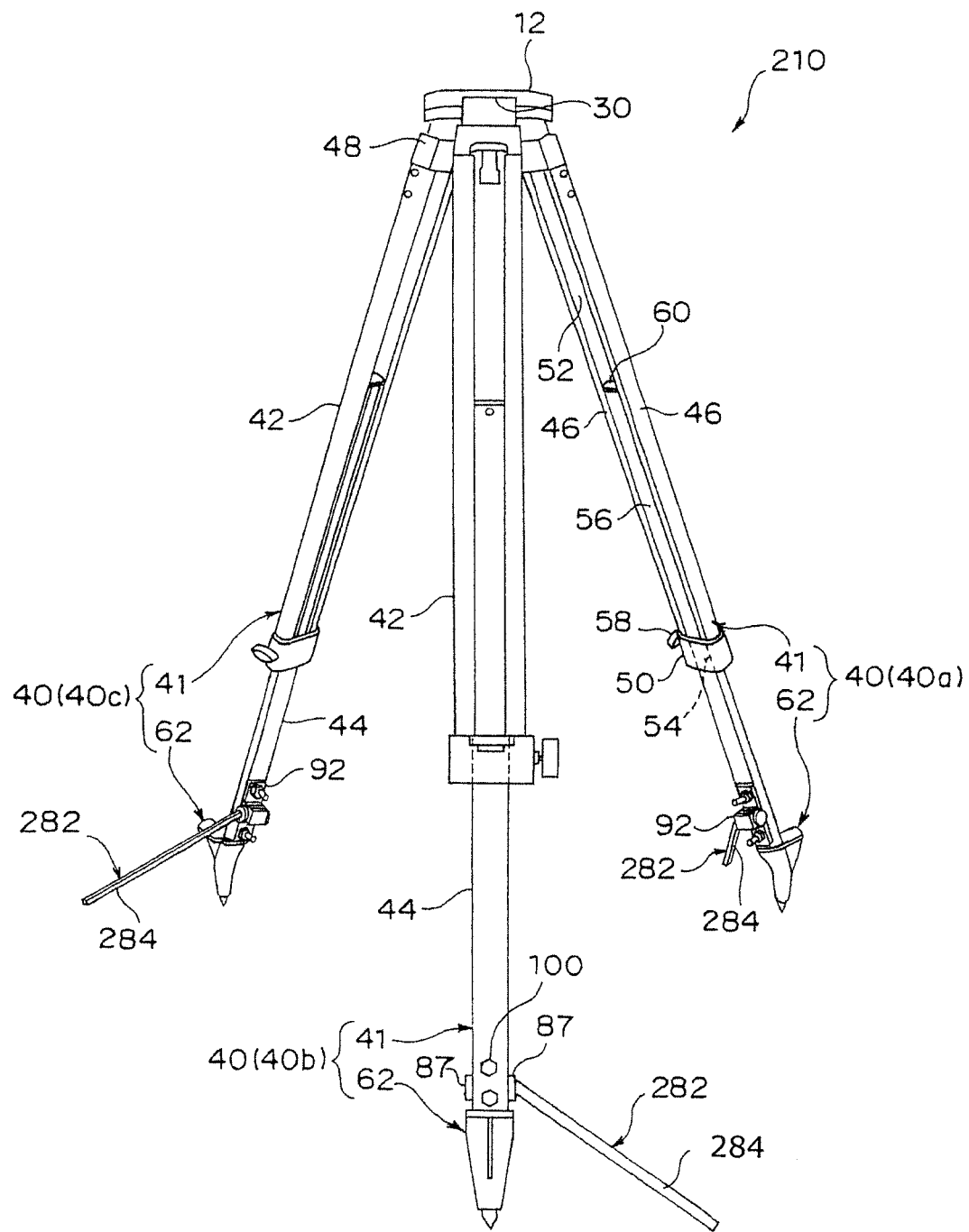
FIG. 11 is a perspective view of a tripod according to the second embodiment of the present invention.

FIG. 11 shows a tripod 210 according to the second embodiment of the present invention. In this embodiment, support members 282 are used in place of the supports members 82 of the first embodiment. Other arrangements are the same as those of the first embodiment.

Figure 12:
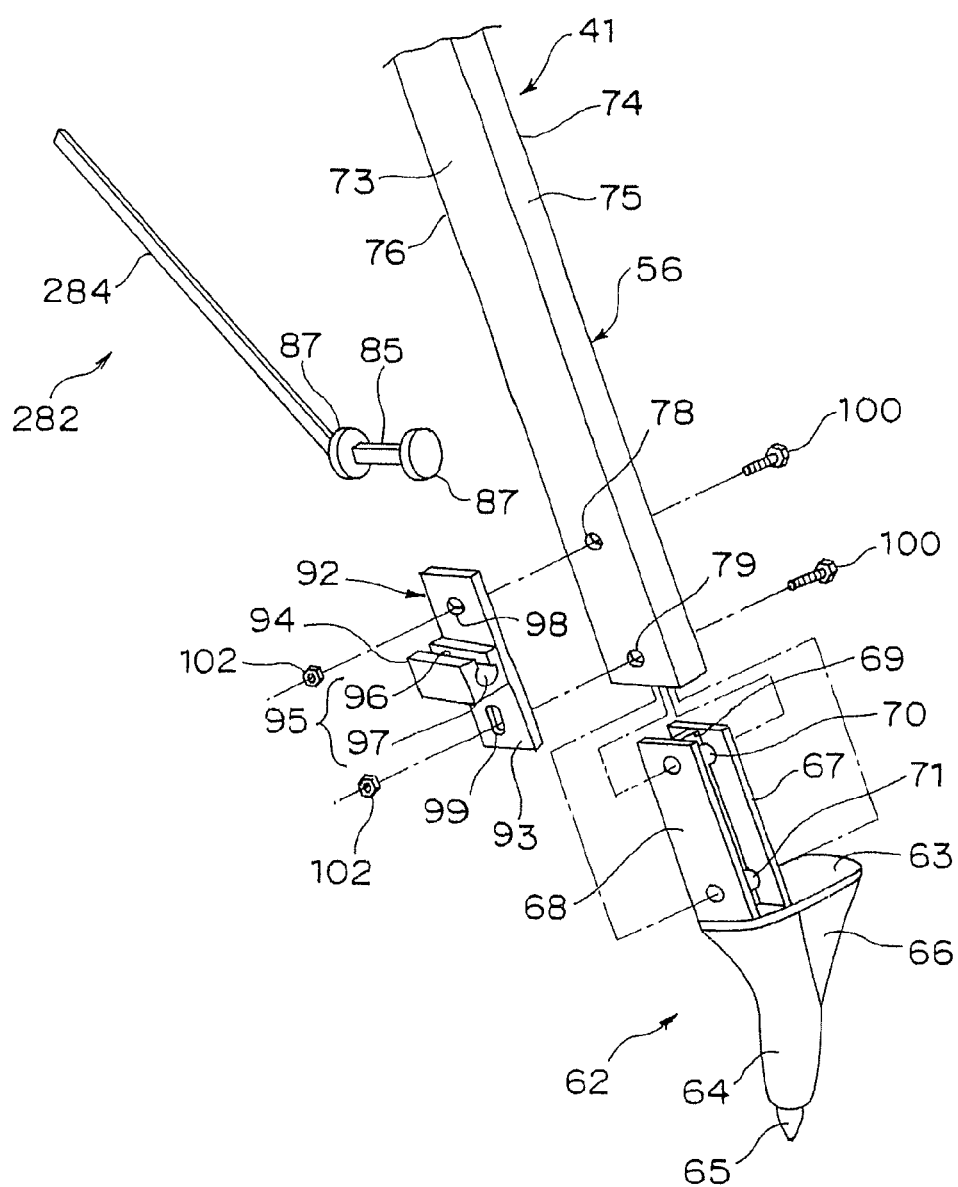
FIG. 12 is an exploded perspective view of the lower end portion of the tripod shown in FIG. 11.

As shown in FIG. 12, the support member 282 has only one elongate portion 284. In this point, the support member 282 is different from that of the first embodiment. The elongate portion 284 has a rectangular cross section. The shape of the cross section is not restrictive to the present invention and may be circular as described in the first embodiment.

Although the support member 282 has only one elongate portion 284, the tripod 210 is well prevented from overturning. Advantageously, the support member 282 occupies smaller space than the support member 82 with two elongate portions 83 and 84 in the first embodiment. This ensures the tripod 210 combined with the support members to be installed in a relatively narrow space. The support member 282 may be attached to the leg 40 so as to project in the opposite direction. As shown in FIG. 11, preferably the support members 282 are attached to the legs 40 so that the elongate portions 284 are projected in the same direction. According to the embodiment, the tripod 210 tilting in any direction is prevented from overturning by the support member 282.

The attaching methods of the support member 282 and the locking member 92 are identical to those described according to the first embodiment. The support member 282 and the locking member 92 in the second embodiment can be modified in different ways.

Third Embodiment

Figure 13:
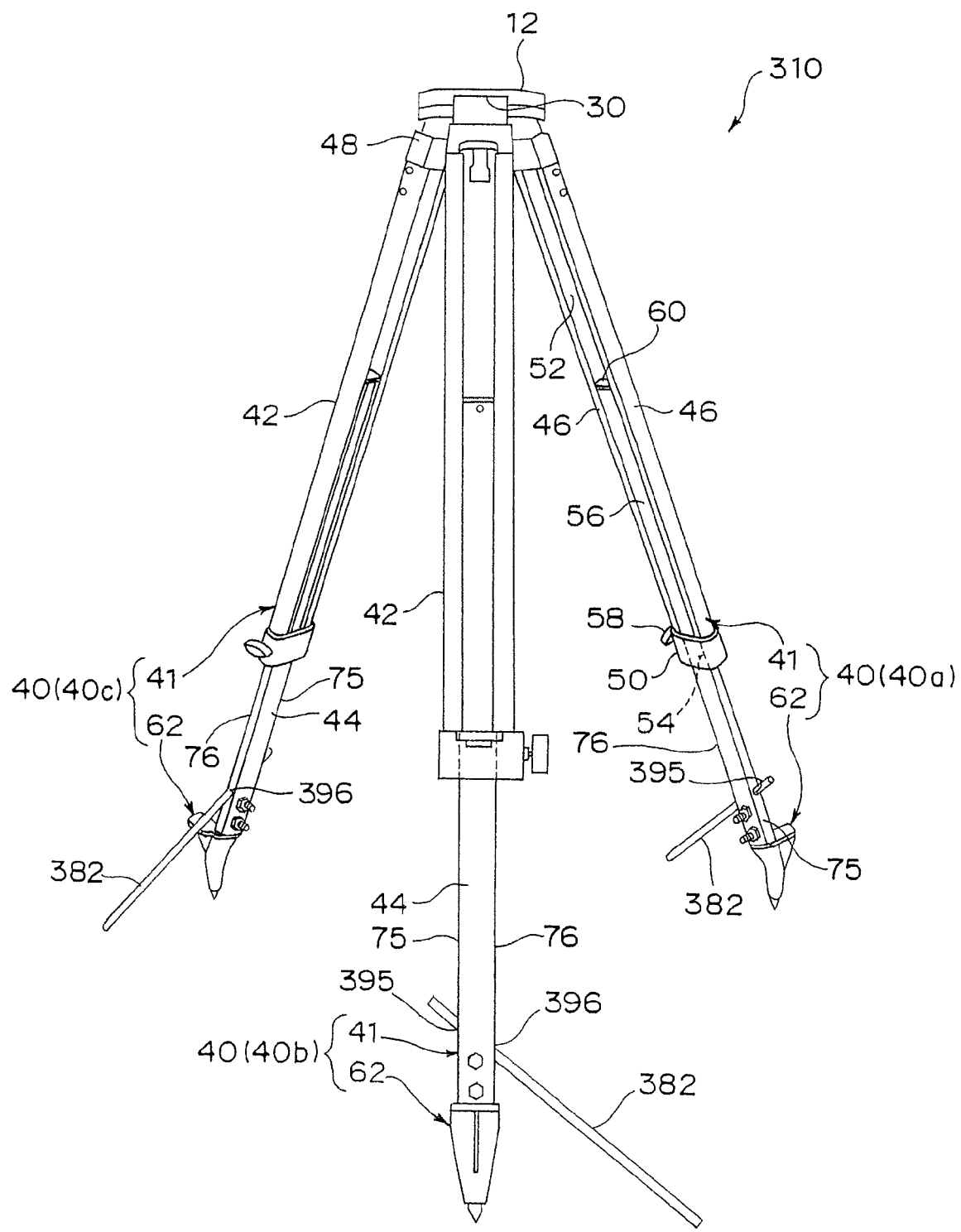
FIG. 13 is a perspective view of a tripod according to the third embodiment of the present invention.

FIG. 13 shows a tripod 310 according to the third embodiment of the present invention. In this embodiment, a support member 382 is used, which is different in structure than the support members 82 and 282 in the first and second embodiments. The support member 382 is directly attached to the leg 56 without using any locking member. Other arrangements in the third embodiment are the same as those in the first and second embodiments.

Figure 14:
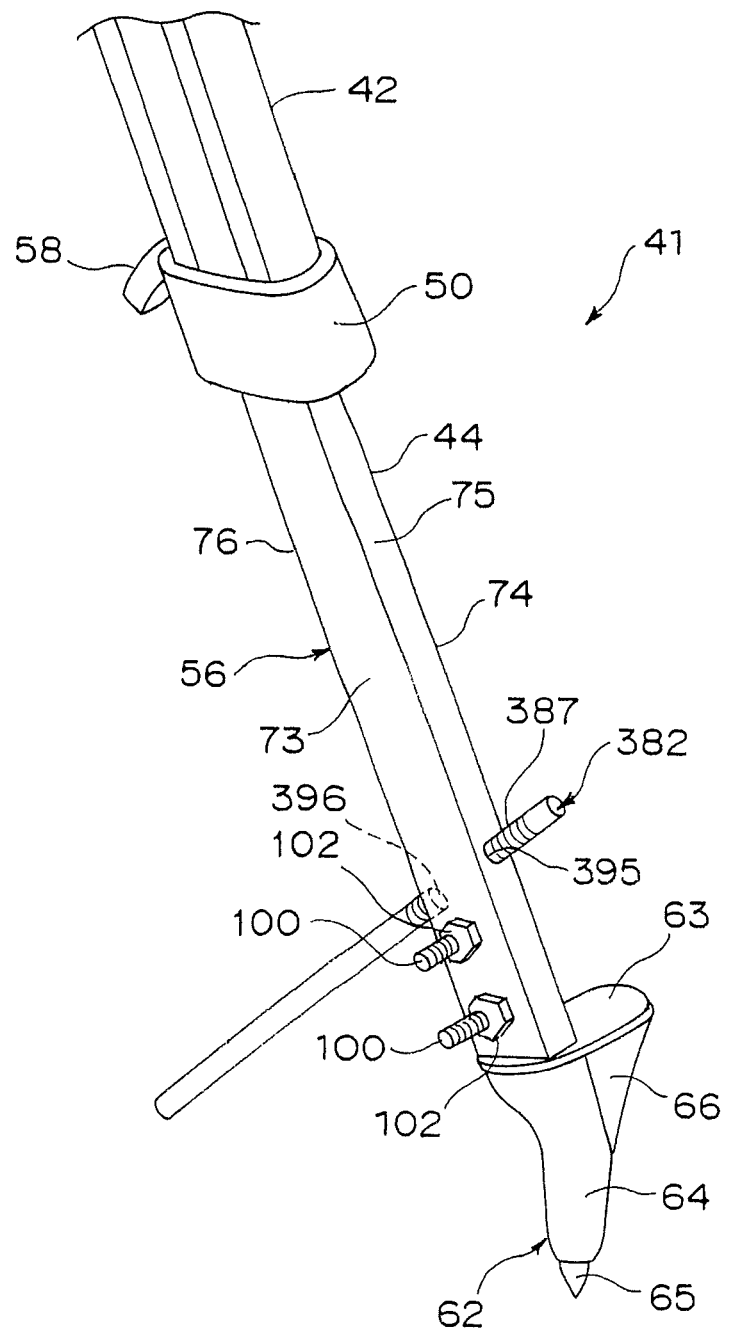
FIG. 14 is a perspective view of the lower end portion of the tripod shown in FIG. 13.

As shown in FIG. 14, in the third embodiment, the column 56 comprises through holes 395 and 396 in its side walls 75 and 76, respectively, defined therein, through which the support member 382 is inserted. The holes 395 and 396 are so formed that the support member 382 received in the holes 395 and 396 can move in the longitudinal direction of the support member 382. For example, the shape of the holes 395 and 396 is designed to be the same or substantially the same as that the cross sectional shape of the support member 382. The size of the holes 395 and 396 is determined to be the same or substantially the same as that of the support member 382. This prevents the support member 382 inserted in the holes 395, 396 from moving in the radial directions and allows the support member 382 to move only in its longitudinal direction. One hole 395 defined in the side wall 75 is positioned higher than the other hole 396 defined in the opposite side wall 76. This allows that the support member 382 made of liner rod is inserted obliquely through the holes 395 and 396. In this embodiment, since the column 56 is made of hollow tube, the column 56 has two through holes 395 and 396. If a solid column is used, only one through hole may be provided to the column.

Although the support member 382 is made of a linear rod in the embodiment, it may be made of non-linear, V-angled member, for example. Also, the support member 382 has a circular cross section, it may take other cross sectional configuration. Further, although the support member 382 has the same cross section at any portions thereof, it may have different cross sections, depending on its longitudinal positions.

The support member 382 may have slippage resistance portions 387 in its upper peripheral surface to prevent the support member 382 from moving in the longitudinal direction within the holes 395 and 396. The provision of the slippage resistance portions 387 increases a frictional force between the inner peripheries of the holes 395 and 396 and the outer peripheries of the support member 382 attached to the column 56. This prevents the support member 382 from dropping out of the column 56 and also increases a tripod supporting force derived from the support member 382.

For combining the support member 382 to the column 56, the lower end of the support member 382 is inserted through one hole 395 and then the other hole 396 toward the ground, allowing the lower end of the support member 382 to hit the ground. The support member 382 thus combined to the column supports the leg 40 as it extends obliquely and downwardly from the column 56 to the ground.

According to the third embodiment, a length of the support member 382 projected from the column 56 can be adjusted according to the upward or downward sloping of the ground on which the tripod is installed and/or the opened angle of the leg 40. The support member 382 is combined with the column 56 simply by inserting and sliding it into the holes 395 and 396. No exclusive locking member is needed for the attachment of the support member 382 to the column 56, which results in an increase of readiness and a reduction of the components.

Various modifications can be made to the support member and/or its associated structures of the column. For example, although one hole 395 is formed at a position higher than the other hole 396 in the above-described embodiment, the one hole 395 may be formed at a position lower than the other hole 396. In this case, the support member 382 is attached to the column 56 so that it inclines downward and to the right, in plan view from the center of the tripod 310. Instead four or more holes may be formed in the column 56. In this case, a plurality of support members 382 can be attached to the column 56.

Fourth Embodiment

Figure 15:
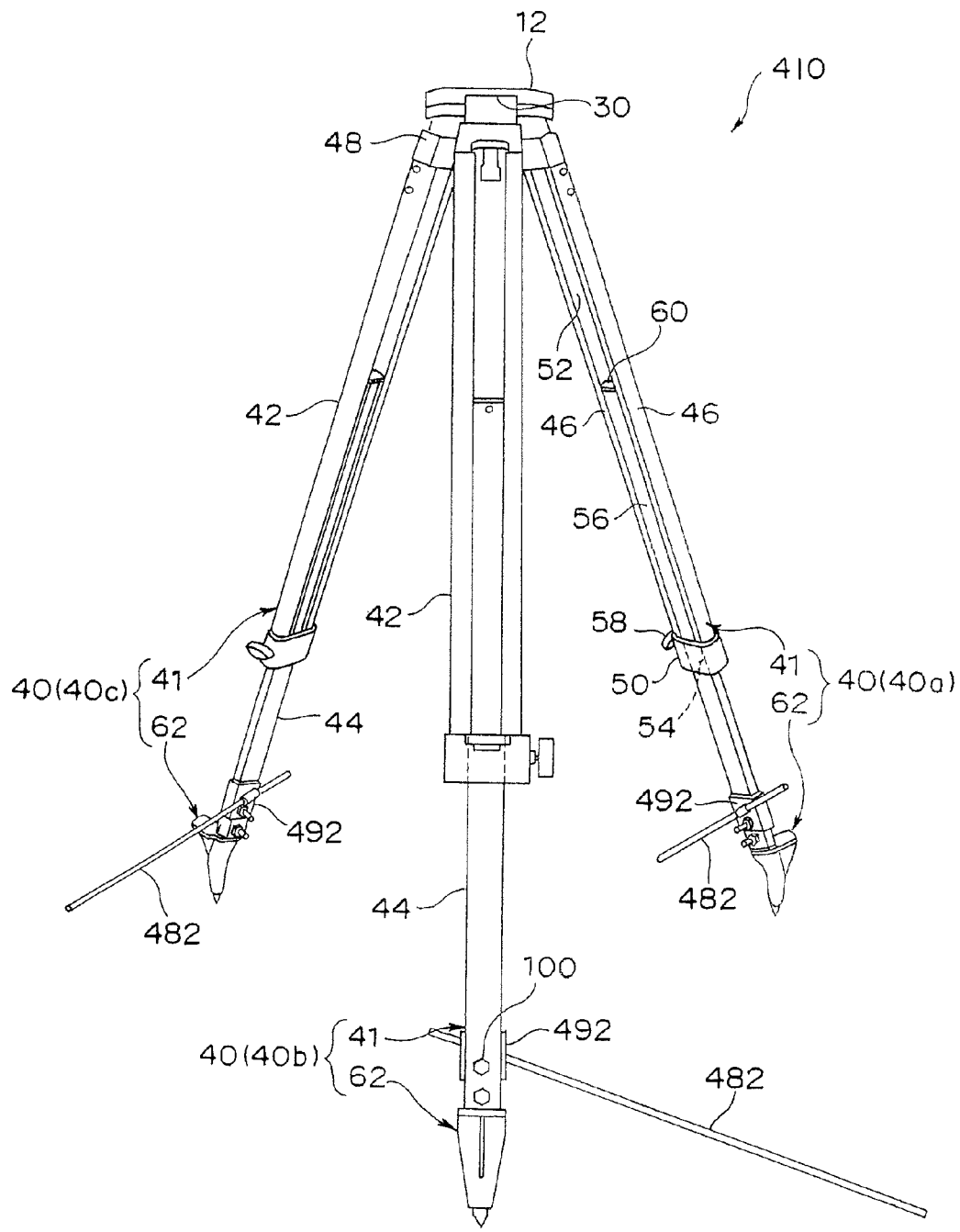
FIG. 15 is a perspective view of a tripod according to the fourth embodiment of the present invention.

FIG. 15 shows a tripod 410 according to the fourth embodiment of the present invention. In this embodiment, support members 482 made of linear rods are used, as well as the third embodiment. However, the support member 482 is attached to the column 56 via a locking member 492 attachable to or detachable from the column 56. In the fourth embodiment, other members except for the support members and the attaching means are the same as those of the first to third embodiments.

Figure 16:
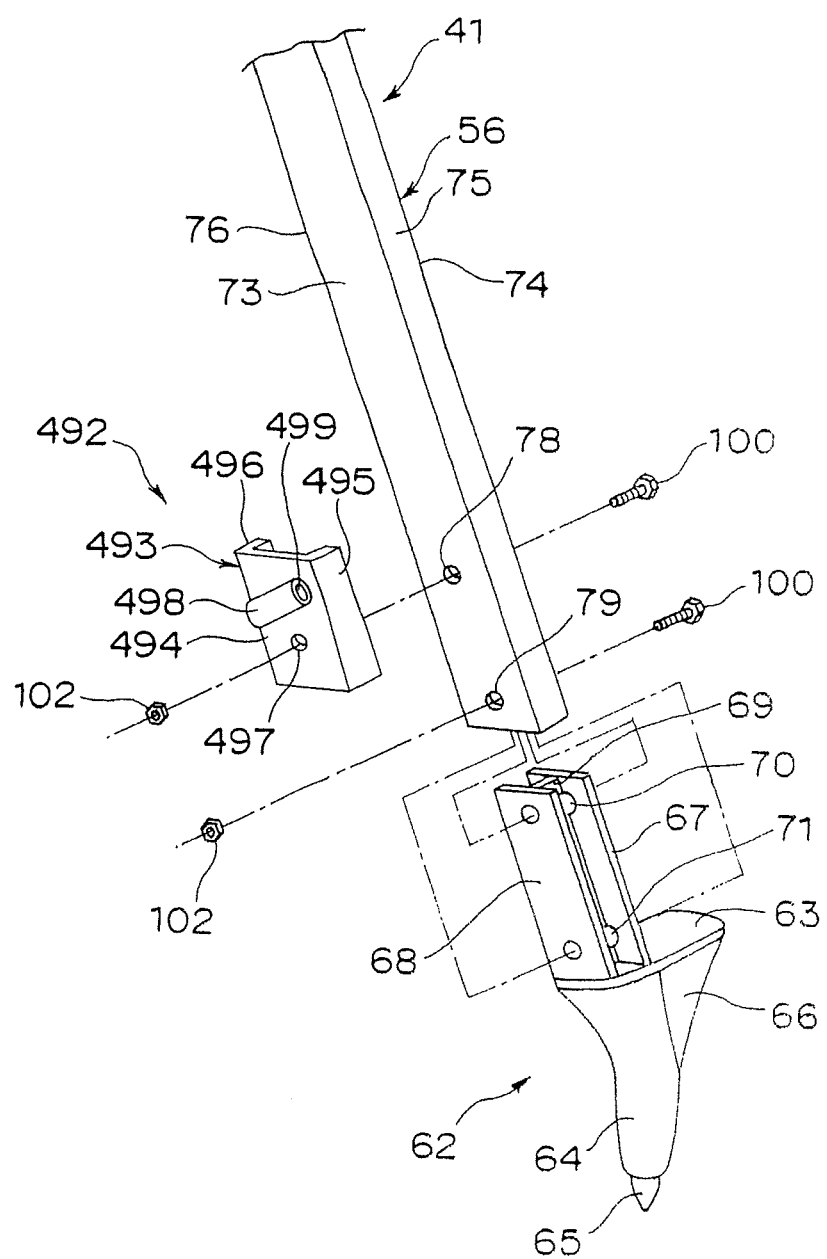
FIG. 16 is an exploded perspective view of the lower end portion of the tripod shown in FIG. 15.

As shown in FIG. 16, the locking member 492 includes a plate portion 493 to be secured to the column 56. The plate portion 493 includes a portion 494 to be secured on the rear side 73 of the column 56, a first contact portion 495 to be brought into contact with one side wall 75 of the column 56, and a second contact portion 496 to be brought into contact with the other side wall 76 of the column 56. The first contact portion 495 is formed extending from one end of the secure portion 494 in the horizontal direction, along a planar direction perpendicular to the secure portion 494. The second contact portion 496 is formed extending from the other end of the secure portion 494 in the horizontal direction, along a planar direction in parallel to the first contact portion 495. In other words, the plate portion 493 has substantially a U-shaped section. A through hole 497 for a bolt is formed in the secure portion 494 of the plate portion 493.

The locking member 492 further includes a cylindrical portion 498 attached on the surface of the secured portion 494 of the plate portion 493. The cylindrical portion 498 is fixed to the secured portion 494, for example, by welding. In this embodiment, the cylindrical portion 498 is provided obliquely relative to the horizontal direction, and the cylindrical portion 498 has a hollow inside to form a hole 499 as a attaching means through which the support member 482 is inserted. The hole 499 is formed in the longitudinal direction of the cylindrical portion 498 and thus is oblique relative to the horizontal direction, as well as the cylindrical portion 498. In the present invention, the portion 498 may take another configuration other than cylindrical configuration.

The hole 499 is so formed that the support member 482 inserted in the hole 499 is permitted to move in the longitudinal direction of the support member 482. Specifically, the hole 499 has a cross section with a shape which is the same or substantially the same as the shape and size of the section of the support member 482. Also, the hole 499 is formed with a diameter equal to or slightly larger than the diameter of the support member 482. The support member 482 inserted in the hole 499 is therefore inhibited from moving in the radius direction of the support member 482 because of the peripheral portion of the hole 499. This in turn means that the support member 482 inserted in the hole 499 can readily slide and move along the lengthwise direction of the support member 482. The hole 499 is so formed as to incline relative to the horizontal direction. This requires the support member 482 to be inserted into the hole 499 as it inclines relative to the horizontal direction.

The locking member 492 is secured to the column 56, together with the foot 62, by aligning the through hole 497 of the secured portion 494 with the through hole 78 of the column 56, inserting a bolt 100 into the through holes 78 and 497, and fastening the bolt 100 with the nut 102. Therefore, it is not needed to provide on the column 56 any special-purpose through hole for use in attaching the locking member 492 to the column 56 or any fixture such as a special-purpose bolt. While the locking member 492 is secured on the inner surface 73 of the column 56 in this embodiment, the locking member 492 may be secured on the outer surface 74 of the column 56.

While the locking member 492 is made of, for example, a metal, there is no limit in selection of a material for the locking member 492 and a resin may be used for example.

Figure 17:
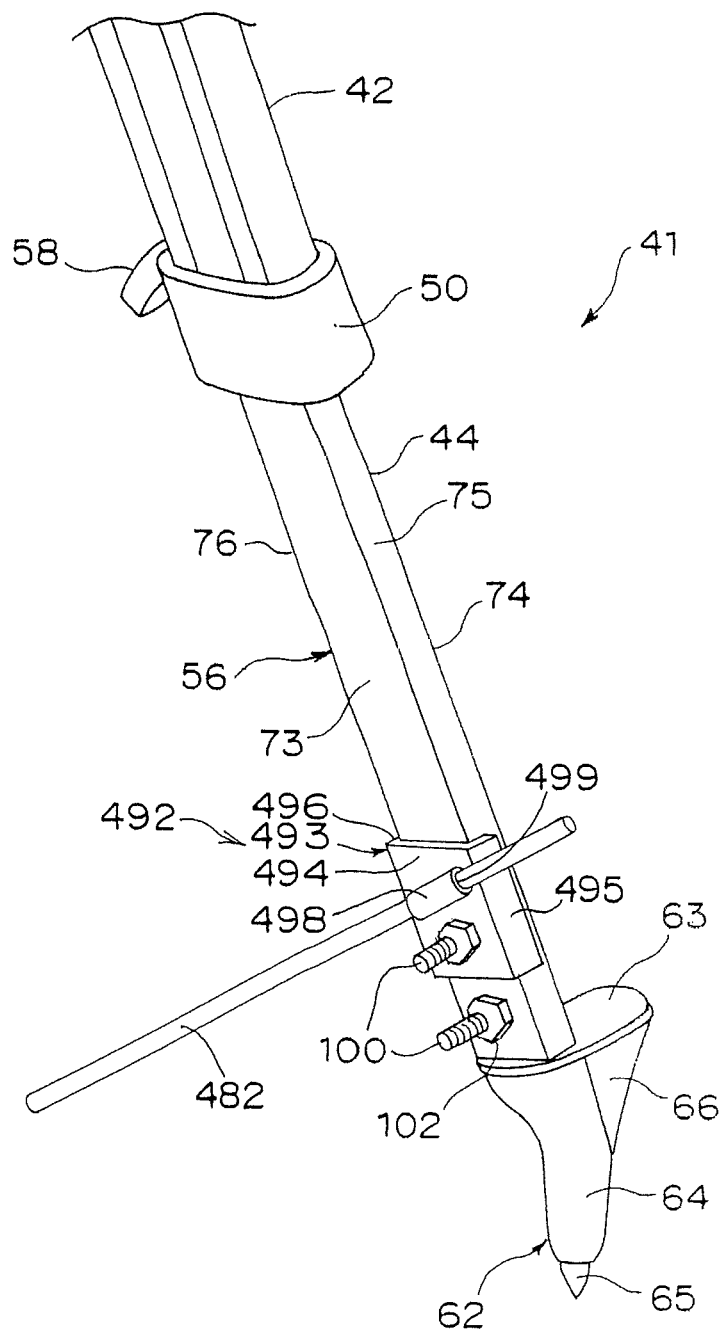
FIG. 17 is a perspective view of the assembling of the members shown in FIG. 16.

As shown in FIG. 17, the support member 482 is made of a linear rod material. The support member 482 may be, for example, a bent rod, other than the linear rod. When a bent support member 482 is used, the hole 499 of the locking member 492 is so formed as to be bent in conformity with the shape of the support member 482. While the sectional shape of the support member 482 is, for example, circular, other shape than circle may be employed. Although the support member 482 has a constant sectional shape throughout its entire length, it may in part have a different sectional shape. In this embodiment, a non-slip portion may be formed on the surface of the support member 482, similar to the third embodiment.

To attach the support member 482 to the column 56 via the locking member 492, the lower end of the support member 482 is inserted, from above, into the hole 499 of the locking member 492, and then, the support member 482 penetrating the hole 499 is moved alongside the lengthwise direction of the support member 482, toward the ground. Thus, the lower end of the support member 482 is placed on the ground, and thus, the attachment of the support member 482 is completed. The support member 482 thus attached to the column 56 via the locking member 492 supports the leg 40, extending from the column 56 to the ground, and inclining downward and to the left, in plan view from the center of the tripod 410.

According to this embodiment, similar to the third embodiment, it is possible to adjust the length of the portion of the support member 482 which is projected from the column 56 obliquely and downward. Because of this advantage, the support member 482 can be set in accordance with a situation such as unevenness of the ground on which the tripod 410 is installed and/or the opening degree of the leg 40. Further, the support member 482 can readily be attached to the column 56, simply by inserting the support member 482 into the hole 499 and sliding the same therein.

In the fourth embodiment, the support member and the attaching means may be changed and modified in various ways.

Figure 18:
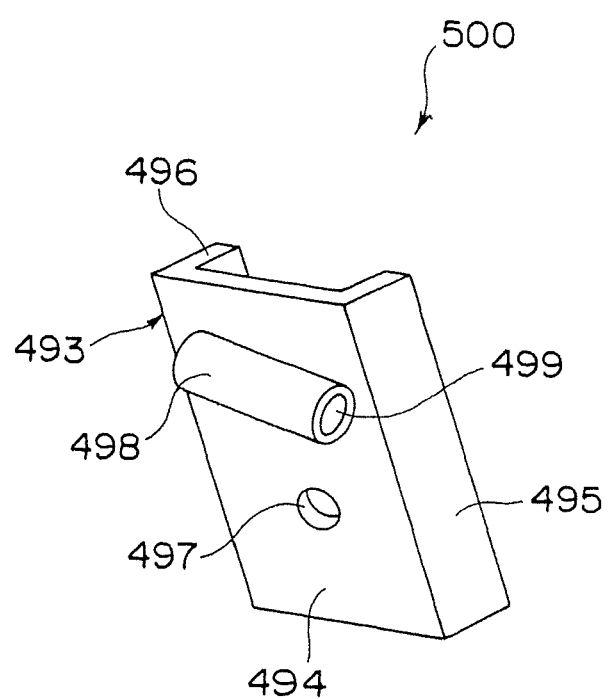
FIG. 18 is a perspective view of a modified example of the locking member shown in FIG. 16.

For example, a locking member 500 as shown in FIG. 18, which includes a cylindrical portion 498 and a hole 499 located inclining downward and to the right on the drawing may be used in place of the locking member 492 shown in FIG. 16, which includes the cylindrical portion 498 and the hole 499 located inclining upward and to the right on the drawing. In this case, the support member 482 can be attached to the locking member 492 as it inclines downward and to the right when viewed from the center of the tripod 410.

Alternatively, the cylindrical portion 498 may be rotatably provided on the secured portion 494. In this embodiment, the hole 499 and the support member 482 can be inclined in opposite direction simply by rotating the cylindrical portion 498.

Further, a plurality of holes 499 may be provided in the locking member 492. In this case, a plurality of support members 482 can be attached to one column 56.

Figure 19:
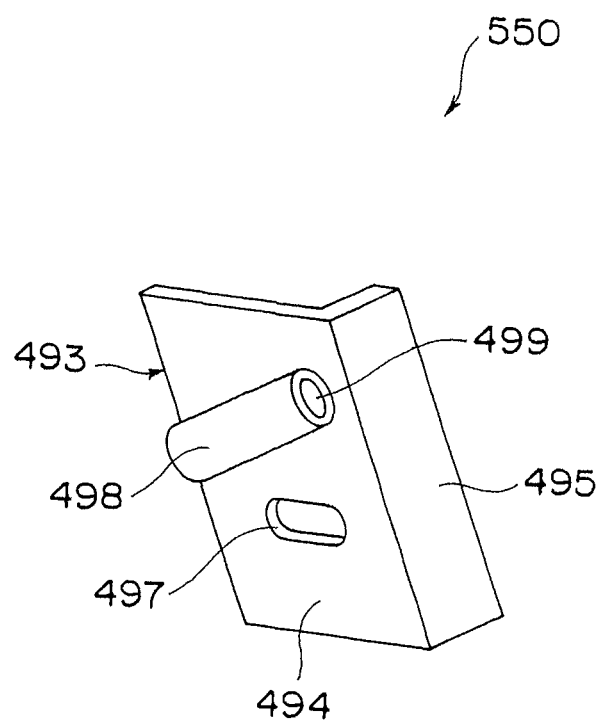
FIG. 19 is a perspective view of another modified example of the locking member shown in FIG. 16.

Furthermore, in place of the locking member 492 with the U-shaped cross-section having the pair of the contact portions 495 and 496, there may be used a locking member 550 with an L-shaped cross-section, having only one contact portion 495, as shown in FIG. 19. When using the locking member 550 with the L-shaped cross-section, the locking member 550 can be secured on the column 56, with its contact portion 495 in contact with the side wall 75 of the column 56, even when the width of the rear side 73 of the column 56 differs from the width of the secured portion 494 of the locking member 550. In this case, preferably, the through hole 497 is formed in the shape of ellipse with its major axis oriented in the horizontal direction. With this arrangement, the through hole 497 of the locking member 550 can be reliably aligned with the through hole 78 of the column 56, independent of the width of the rear side 73 of the column 56.

Fifth Embodiment

Figure 20:
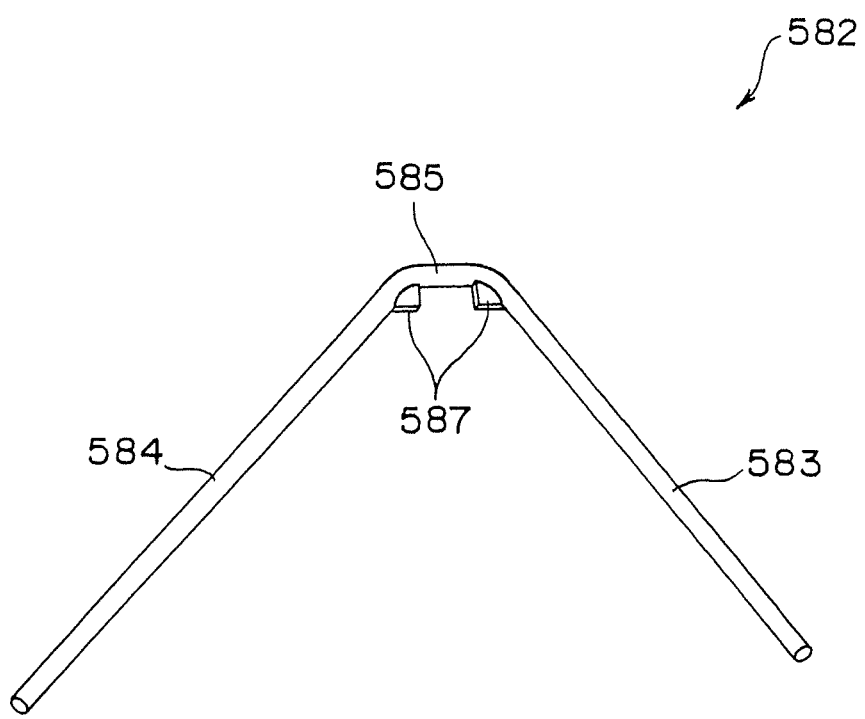
FIG. 20 is a perspective view of a modified example of the support member shown in FIG. 14.
Figure 21:
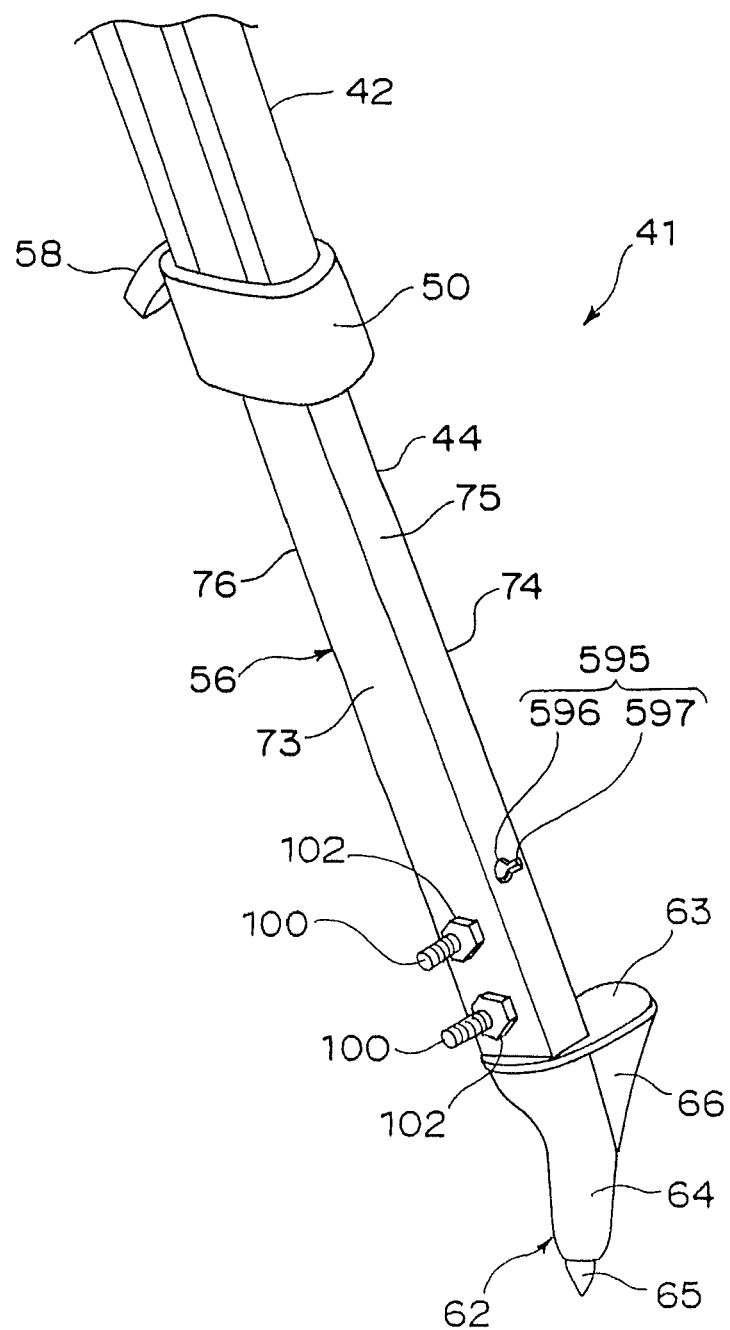
FIG. 21 is a perspective view of a concrete example of a hole bored in the leg, in case where the support member shown in FIG. 20 is used.
Figure 22:
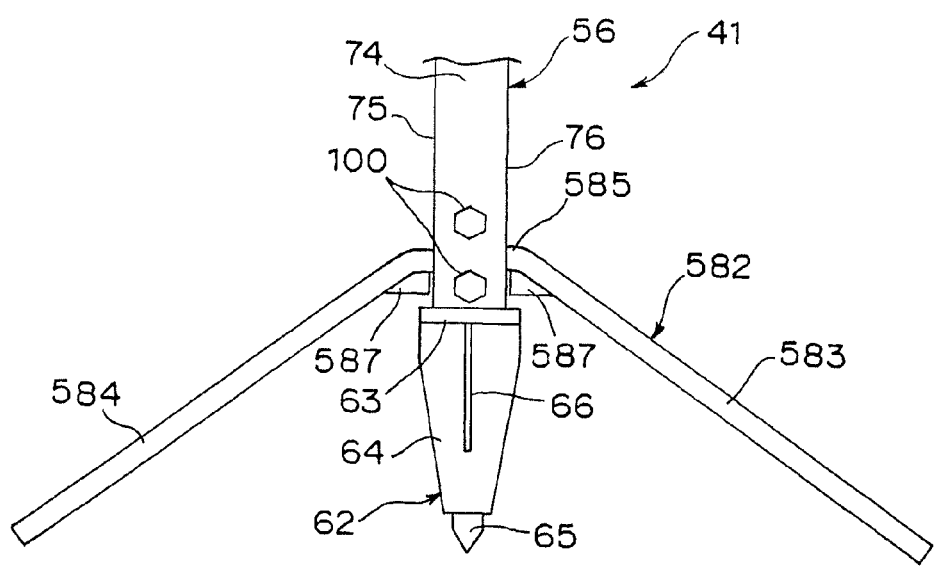
FIG. 22 is a plan view of an attached state of the support member shown in FIG. 20.

With reference to FIGS. 20 to 22, the fifth embodiment of the present invention will be described. In the fifth embodiment, a support member 582 shown in FIG. 20 is used. Also, a attaching means or hole 595 is formed at the side walls 75 and 76 of the column 56 as shown in FIG. 21, which allows that the support member 582 is inserted therein along a predetermined penetrating direction.

As shown in FIG. 20, the support member 582 includes a fit-in portion 585 to be fitted in the hole 595 of the column 56, and a pair of elongate portions 583 and 584 extending from the fit-in portion 585. The elongate portions 583 and 584 are allowed to extend along directions which obliquely intersect the lengthwise direction of the fit-in portion 585, respectively, so as to space away gradually from the fit-in portion 585. The lengthwise directions of the two elongate portions 583 and 584 are substantially perpendicular to each other. The two elongate portions 583 and 584 have substantially the same lengths and are positioned on the same plane. With this arrangement, the support member 582 can be rotated around the axis of insertion with the fit-in portion 585 fitted in the hole 595, i.e., with the support member 583 penetrating the column 56 in the predetermined direction. This results in that distal ends of the two elongate portions 583 and 584 are substantially simultaneously placed on the ground. Triangular rib-shaped stops 587 are provided at opposite ends of the fit-in portion 585 so that they extend from the fit-in portion 585 into the elongate portions 583 and 584, respectively. The sectional shapes of the fit-in portion 585 and the elongate portions 583 and 584 are, for example, circular, and the support member 582 is bent at opposite portions thereof. The sectional shapes of the fit-in portion 585 and the elongate portions 583 and 584 are not limited to circular and may be of any of various shapes.

As shown in FIG. 21, each hole 595 includes a circular portion 596 in which the fit-in portion 585 of the support member 582 is fitted in and a slot 597 extending radially outwardly from the circular portion 596 through which the stops 587 of the support member 582 penetrate. The holes 595 are provided in the side walls 75 and 76 of the column 56 at substantially the same level. The support member 582 is attached to the column 56 by passing one elongate portion 583 and the fit-in portion 585 of the support member 582 through the hole 595. In this operation, the support member 582 is inserted in a direction that allows the stop 587 joining one elongate portion 583 and the fit-in portion 585 to pass through the slot portion 597 of the hole 595. Then, after one stop 587 is passed through the hole 595 of the column 56, the support member 582 is rotated so that the distal ends of the elongate portions 583 and 584 are placed on the ground. Thus, as shown in FIG. 22, the support member 582 is attached to the column 56 and the column 56 is sandwiched between the two stops 587 of the support member 582, which prohibits the movement of the fit-in portion 585 in the hole 595 of the column 56.

To attach the support member 582 to the column 56, one elongate portion 583 (or 584) of the support member 582 is inserted into the hole 595 of the column 56. When the proximal portion of the one elongate portion 583 (or 584) is inserted into the hole 595, the direction of the support member 582 is adjusted so that the stop 587 can pass through the slot portion 597 of the hole 595. Once the one elongate portion 583 (or 584) has passed through the hole 595, the fit-in portion 585 is fitted in the hole 595, so that the support member 582 penetrates the column 56 along the lengthwise direction of the fit-in portion 585. Subsequently, the fit-in portion 585 is rotated about the penetrating direction within the hole 595, to thereby place the distal ends of the two elongate portions 583 and 584 on the ground.

Sixth Embodiment

Figure 23:
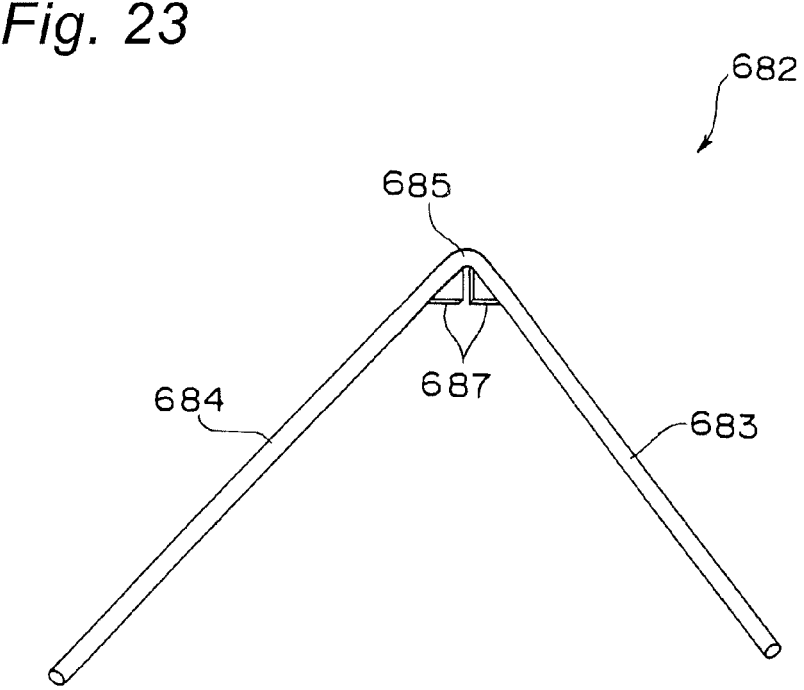
FIG. 23 is a perspective view of a concrete example of a support member to be attached to a foot.
Figure 25:
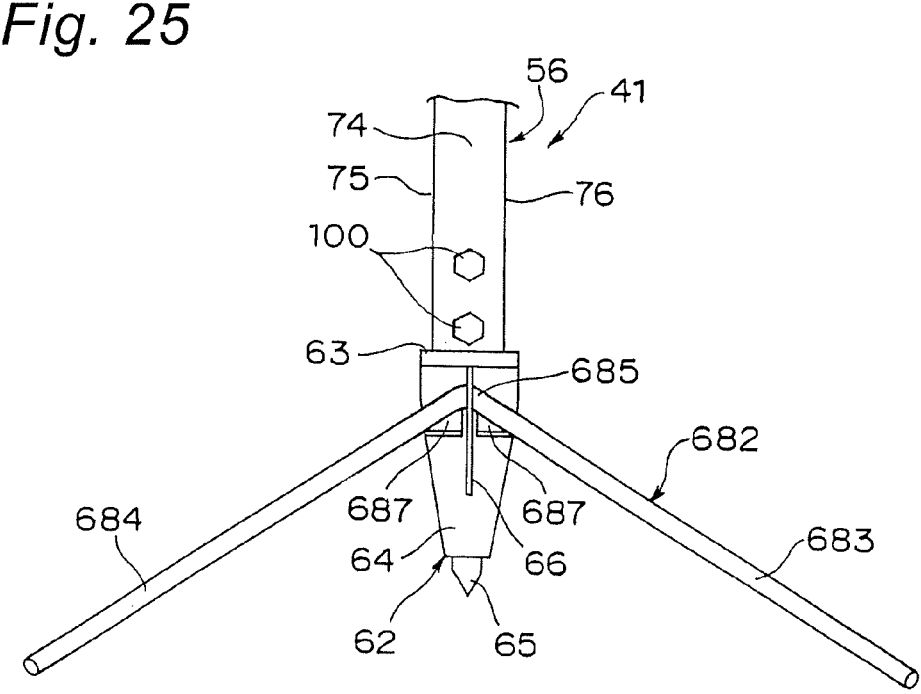
FIG. 25 is a front view of an attached state of the support member shown in FIG. 23.
Figure 24:
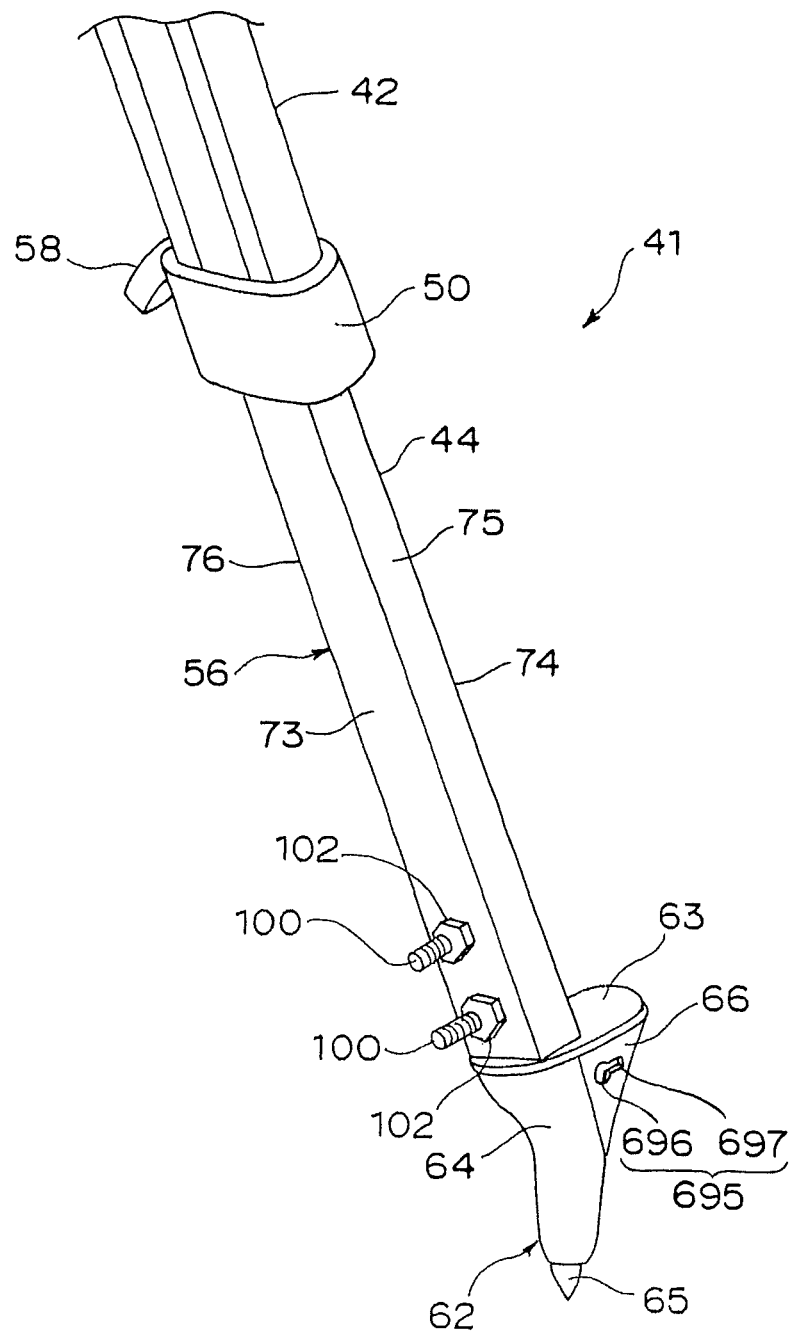
FIG. 24 is a perspective view of a concrete example of a hole bored in the foot.

With reference to FIGS. 23 to 25, the sixth embodiment of the present invention will be described. In the sixth embodiment, a support member 682 shown in FIG. 23 is used. As shown in FIG. 24, a attaching means or hole 695 for allowing the support member 682 to penetrate in a predetermined penetrating direction is formed in the foot 62 of the leg 40.

As shown in FIG. 23, the support member 682 includes a pair of elongate portions 683 and 684 which extend in directions vertical to each other. The ends of the elongate portions 683 and 684 are connected to each other. This connected portion serves as a fit-in portion 685 to be fitted in the hole 695. The sectional shapes of the fit-in portion 685 and the elongate portions 683 and 684 are circular, for example. The support member is angled at plural portions thereof. However, the sectional shapes of the fit-in portion 685 and the elongate portions 683 and 684 are not limited to this and may be of any of various shapes. The two elongate portions 683 and 684 have substantially the same lengths and are positioned in the same plane. According to this arrangement, when the support member 682 is rotated around the axis extending in the penetrating direction, with the fit-in portion 685 fitted in the hole 695, the distal ends of the elongate portions 683 and 684 are almost simultaneously placed on the ground. Triangular rib-like stops 687 each in contact with the fit-in portion 685 and the elongate portion 683 or 684 are provided between the fit-in portion 685 and the elongate portions 683 and 684.

As shown in FIG. 24, the hole 695 is formed in the rib plate 66 of the foot 62. The hole 695 includes a circular portion 696 which fits around the fit-in portion 685 of the support member 62 and a slot portion 697 which communicates with the hole 696 and permits passing of the stops 687 of the support member 682. The support member 682 is attached to the foot 62 by allowing one elongate portion 683 and the fit-in portion 685 of the support member 682 to pass through the hole 695. In this stage, the support member 682 is inserted in such a direction that the stop 687 in contact with the one elongate portion 683 and the fit-in portion 685 is allowed to pass through the slot portion 697. Thus, the fit-in portion 685 is fitted in the hole 695, and the support member 682 is allowed to penetrate the foot 62 along the lengthwise direction of the fit-in portion 685. Subsequently, the fit-in portion 685 is rotated about the axis extending in the penetrating direction within the hole 695, to thereby place the distal ends of the two elongate portions 683 and 684 on the ground. Thus, the support member 682 is attached as shown in FIG. 25, and the rib plate 66 of the foot 62 is sandwiched between the two stops 687 of the support member 682, so that moving of the fit-in portion 685 fitted in the hole 695 is inhibited.

While the present invention has been fully described by way of the foregoing embodiments, the scope of the present invention is not limited to these ones in any way.

REFERENCE NUMERALS

10, 210, 310, 410: tripod
12: table
40: leg
41: leg body
56: leg
62: foot
66: rib plate
78, 79: through hole
82, 182, 282, 382, 482, 582, 682: support member
83, 84, 183, 184, 284, 583, 584, 683, 684: elongate portion
85, 185, 585, 685: fit-in portion
87, 187, 587, 687: stop
92, 192: locking member
95: groove
96: inlet/outlet portion
97: bottom
98, 99: through hole
100: bolt
102: nut
395, 396: hole
499: hole
595: hole
596: fit-around portion
597: slot portion
695: hole
696: fit-around portion
697: slot portion

The invention claimed is:

1. A tripod-supporting device for supporting a tripod which includes a table for supporting an instrument thereon, and three legs jointed to said table, comprising:
   a support member attachable to the lower end of said leg so as to support said tripod; and
   an attachment in the form of a hole or groove which is formed in one of said three legs or formed in a member attached to one of said three legs;
   wherein said support member includes a fit-in portion to be fitted in said attaching means, so that said support member penetrates said member in a predetermined direction and an elongate portion provided extending from said fit-in portion in a predetermined direction;
   the distal end of said elongate portion is placed on the ground by rotating said support member around the axis extending in said penetrating direction, with said fit-in portion fitted in said attachment; and
   said elongate portion is so disposed as to extend in a direction from said fit-in portion to the ground, toward which direction the tripod is liable to overturn, when the distal end of said elongate portion is placed on the ground;
   wherein said attachment is made of said groove;
   said groove includes a bottom portion which receives said fit-in portion, and an inlet/outlet portion which communicates with an exterior space of said groove and an interior space of said bottom portion and has a width smaller than that of said bottom portion; and
   said fit-in portion has such a shape that allows the fit-in portion to pass through said inlet/outlet portion only in a predetermined direction.

2. The tripod-supporting device of claim 1, wherein
   said bottom portion has a circular cross-section; and
   a section of said fit-in portion has a shape of a rectangle which has shorter sides smaller than the width of said inlet/outlet portion, and longer sides larger than the width of said inlet/outlet portion and smaller than the diameter of said bottom portion.

3. A tripod-supporting device for supporting a tripod which includes a table for supporting an instrument thereon, and three legs jointed to said table, comprising:
   a support member attachable to the lower end of said leg so as to support said tripod; and
   an attachment in the form of a hole or groove which is formed in one of said three legs or formed in a member attached to one of said three legs;
   wherein said support member includes a fit-in portion to be fitted in said attaching means, so that said support member penetrates said member in a predetermined direction and an elongate portion provided extending from said fit-in portion in a predetermined direction;
   the distal end of said elongate portion is placed on the ground by rotating said support member around the axis extending in said penetrating direction, with said fit-in portion fitted in said attachment; and
   said elongate portion is so disposed as to extend in a direction from said fit-in portion to the ground, toward which direction the tripod is liable to overturn, when the distal end of said elongate portion is placed on the ground;
   wherein said support member includes a stop which inhibits moving of said fit-in portion within said attachment; and
   wherein said attachment is composed of a groove;
   said fit-in portion has a length equal to or slightly larger than the length of said groove; and
   said stops are provided on both ends of said fit-in portion in the lengthwise direction of said fit-in portion.

4. A tripod-supporting device for supporting a tripod which includes a table for supporting an instrument thereon, and three legs jointed to said table, comprising:
   a support member attachable to the lower end of said leg so as to support said tripod; and
   an attachment in the form of a hole or groove which is formed in one of said three legs or formed in a member attached to one of said three legs;
   wherein said support member includes a fit-in portion to be fitted in said attaching means, so that said support member penetrates said member in a predetermined direction and an elongate portion provided extending from said fit-in portion in a predetermined direction;
   the distal end of said elongate portion is placed on the ground by rotating said support member around the axis extending in said penetrating direction, with said fit-in portion fitted in said attachment; and
   said elongate portion is so disposed as to extend in a direction from said fit-in portion to the ground, toward which direction the tripod is liable to overturn, when the distal end of said elongate portion is placed on the ground;

wherein said leg includes a major leg part jointed to said table, and a foot secured to a lower end of the major leg part by a fixture;

said support member is attached to said leg via the member; and said locking member is secured to said major leg part by a fixture, together with said foot.

5. A tripod-supporting device for supporting a tripod which includes a table for supporting an instrument thereon, and three legs jointed to said table, comprising:

a support member attachable to the lower end of said leg so as to support said tripod; and an attachment in the form of a hole or groove which is formed in one of said three legs or formed in a member attached to one of said three legs;

wherein said support member includes a fit-in portion to be fitted in said attaching means, so that said support member penetrates said member in a predetermined direction and an elongate portion provided extending from said fit-in portion in a predetermined direction;

the distal end of said elongate portion is placed on the ground by rotating said support member around the axis extending in said penetrating direction, with said fit-in portion fitted in said attachment; and said elongate portion is so disposed as to extend in a direction from said fit-in portion to the ground, toward which direction the tripod is liable to overturn, when the distal end of said elongate portion is placed on the ground;

wherein said support member includes only one elongate portion, and said elongate portion is disposed at one of both sides of said leg when viewed from above.

6. A support member for supporting a tripod which includes a table for supporting an instrument thereon, and three legs jointed to said table, said support member comprising:

a fit-in portion to be fitted in a attachment composed of a hole or a groove formed in a leg or another member attached to said leg, so that said support member can penetrate said leg or said another member in a predetermined direction;

an elongate portion which has a distal end to be placed on the ground by rotating said support member around an axis of said penetrating direction, with said fit-in portion fitted in said attachment, and which is so disposed as to extend in a direction from said fit-in portion to the ground, toward which direction the tripod is liable to overturn, when said distal end of said elongate portion has been placed on the ground; and wherein said supporting member has only one elongate portion that is disposed at one side of said leg when viewed from above.

* * * * *